(12) United States Patent
Sridhar et al.

(10) Patent No.: US 9,947,955 B2
(45) Date of Patent: Apr. 17, 2018

(54) MODULAR FUEL CELL SYSTEM

(71) Applicant: BLOOM ENERGY CORPORATION, Sunnyvale, CA (US)

(72) Inventors: K. R. Sridhar, Los Gatos, CA (US); Swaminathan Venkataraman, Cupertino, CA (US); William David Lyle, San Francisco, CA (US); Arne Ballantine, Palo Alto, CA (US)

(73) Assignee: BLOOM ENERGY CORPORATION, Sunnyvale, CA (US)

( * ) Notice: Subject to any disclaimer, the term of this patent is extended or adjusted under 35 U.S.C. 154(b) by 122 days.

(21) Appl. No.: 14/881,685

(22) Filed: Oct. 13, 2015

(65) Prior Publication Data

US 2016/0072146 A1  Mar. 10, 2016

Related U.S. Application Data

(63) Continuation of application No. 11/656,006, filed on Jan. 22, 2007, now Pat. No. 9,190,693.
(Continued)

(51) Int. Cl.
*H01M 8/24* (2016.01)
*H01M 8/06* (2016.01)
(Continued)

(52) U.S. Cl.
CPC ......... *H01M 8/249* (2013.01); *B60L 11/1896* (2013.01); *H01M 8/04007* (2013.01);
(Continued)

(58) Field of Classification Search
CPC ......... H01M 8/04007; H01M 8/04201; H01M 8/0675; H01M 8/2475; H01M 8/2485; H01M 8/249; Y02E 60/50; B60L 11/1896
See application file for complete search history.

(56) References Cited

U.S. PATENT DOCUMENTS 3,453,087 A   7/1969  Herp, Jr. et al.
3,453,146 A   7/1969  Bawa et al.
(Continued)

FOREIGN PATENT DOCUMENTS

CA    2653441 A1    1/2008
DE   19822697 C1   10/1999
(Continued)

OTHER PUBLICATIONS

Haynes International High-Temperature Alloys, "Haynes (Reg.) 214 (TM) alloy", 1996, pp. 1-19.
(Continued)

*Primary Examiner* — Carlos Barcena
(74) *Attorney, Agent, or Firm* — The Marbury Law Group PLLC

(57) ABSTRACT

A fuel cell stack module includes a base, a cover dome removably positioned on the base, and a plurality of fuel cell stacks removably positioned on the base below the cover dome. A modular fuel cell system includes a plurality of the fuel cell stack modules, where each fuel cell stack module may be electrically disconnected, removed from the fuel cell system, repaired or serviced without stopping an operation of the other fuel cell stack modules in the fuel cell system.

8 Claims, 7 Drawing Sheets

Related U.S. Application Data

(60) Provisional application No. 60/760,933, filed on Jan. 23, 2006.

(51) Int. Cl.
  *H01M 8/249* (2016.01)
  *H01M 8/04007* (2016.01)
  *H01M 8/2475* (2016.01)
  *H01M 8/2485* (2016.01)
  *H01M 8/0662* (2016.01)
  *B60L 11/18* (2006.01)
  *H01M 8/04082* (2016.01)

(52) U.S. Cl.
  CPC ....... *H01M 8/0675* (2013.01); *H01M 8/2475* (2013.01); *H01M 8/2485* (2013.01); *H01M 8/04201* (2013.01); *Y02E 60/50* (2013.01); *Y02T 90/34* (2013.01)

(56) References Cited

U.S. PATENT DOCUMENTS

| | | |
|---|---|---|
| 3,488,266 A | 1/1970 | French |
| 3,527,565 A | 9/1970 | Banchik et al. |
| 3,531,263 A | 9/1970 | Sederquist |
| 3,607,419 A | 9/1971 | Keating, Jr. |
| 3,645,701 A | 2/1972 | Banchik et al. |
| 3,718,506 A | 2/1973 | Fischer et al. |
| 3,746,658 A | 7/1973 | Porta et al. |
| 3,972,731 A | 8/1976 | Bloomfield et al. |
| 3,973,993 A | 8/1976 | Bloomfield et al. |
| 3,976,506 A | 8/1976 | Landau |
| 3,982,962 A | 9/1976 | Bloomfield |
| 3,990,912 A | 11/1976 | Katz |
| 4,001,041 A | 1/1977 | Menard |
| 4,004,947 A | 1/1977 | Bloomfield |
| 4,041,210 A | 8/1977 | Van Dine |
| 4,098,722 A | 7/1978 | Cairns et al. |
| 4,182,795 A | 1/1980 | Baker et al. |
| 4,190,559 A | 2/1980 | Retallick |
| 4,315,893 A | 2/1982 | McCallister |
| 4,342,816 A | 8/1982 | Kothmann et al. |
| 4,365,007 A | 12/1982 | Maru et al. |
| 4,374,184 A | 2/1983 | Somers et al. |
| 4,402,871 A | 9/1983 | Retallick |
| 4,430,304 A | 2/1984 | Spurrier et al. |
| 4,473,517 A | 9/1984 | Goedtke et al. |
| 4,473,622 A | 9/1984 | Chludzinski et al. |
| 4,522,894 A | 6/1985 | Hwang et al. |
| 4,532,192 A | 7/1985 | Baker et al. |
| 4,539,267 A | 9/1985 | Sederquist |
| 4,548,875 A | 10/1985 | Lance et al. |
| 4,554,223 A | 11/1985 | Yokoyama et al. |
| 4,567,117 A | 1/1986 | Patel et al. |
| 4,647,516 A | 3/1987 | Matsumura et al. |
| 4,654,207 A | 3/1987 | Preston |
| 4,657,829 A | 4/1987 | Mcelroy et al. |
| 4,670,359 A | 6/1987 | Beshty et al. |
| 4,678,723 A | 7/1987 | Wertheim |
| 4,696,871 A | 9/1987 | Pinto |
| 4,702,973 A | 10/1987 | Marianowski |
| 4,716,023 A | 12/1987 | Christner et al. |
| 4,722,873 A | 2/1988 | Matsumura |
| 4,728,584 A | 3/1988 | Isenberg |
| 4,737,161 A | 4/1988 | Szydlowski et al. |
| 4,792,502 A | 12/1988 | Trocciola et al. |
| 4,808,491 A | 2/1989 | Reichner |
| 4,810,472 A | 3/1989 | Andrew et al. |
| 4,812,373 A | 3/1989 | Grimble et al. |
| 4,820,314 A | 4/1989 | Cohen et al. |
| 4,824,740 A | 4/1989 | Abrams et al. |
| 4,828,940 A | 5/1989 | Cohen et al. |
| 4,847,051 A | 7/1989 | Parenti, Jr. |
| 4,865,926 A | 9/1989 | Levy et al. |
| 4,898,792 A | 2/1990 | Singh et al. |
| 4,904,548 A | 2/1990 | Tajima |
| 4,917,971 A | 4/1990 | Farooque |
| 4,933,242 A | 6/1990 | Koga et al. |
| 4,983,471 A | 1/1991 | Reichner et al. |
| 4,994,331 A | 2/1991 | Cohen |
| 5,009,967 A | 4/1991 | Scheffler |
| 5,034,287 A | 7/1991 | Kunz |
| 5,039,579 A | 8/1991 | Kinoshita |
| 5,047,299 A | 9/1991 | Shockling |
| 5,077,148 A | 12/1991 | Schora et al. |
| 5,079,105 A | 1/1992 | Bossel |
| 5,082,751 A | 1/1992 | Reichner |
| 5,082,752 A | 1/1992 | Koga et al. |
| 5,084,363 A | 1/1992 | Reiser |
| 5,084,632 A | 1/1992 | Farooque |
| 5,091,075 A | 2/1992 | O'neill et al. |
| 5,100,743 A | 3/1992 | Narita et al. |
| 5,143,800 A | 9/1992 | George et al. |
| 5,169,730 A | 12/1992 | Reichner et al. |
| 5,170,124 A | 12/1992 | Blair et al. |
| 5,175,062 A | 12/1992 | Farooque et al. |
| 5,187,024 A | 2/1993 | Matsumura |
| 5,212,022 A | 5/1993 | Takahashi et al. |
| 5,227,256 A | 7/1993 | Marianowski et al. |
| 5,232,792 A | 8/1993 | Reznikov |
| 5,246,791 A | 9/1993 | Fisher et al. |
| 5,270,127 A | 12/1993 | Koga et al. |
| 5,302,470 A | 4/1994 | Okada et al. |
| 5,324,452 A | 6/1994 | Allam et al. |
| 5,328,779 A | 7/1994 | Tannenberger et al. |
| 5,340,664 A | 8/1994 | Hartvigsen |
| 5,344,721 A | 9/1994 | Sonai et al. |
| 5,346,779 A | 9/1994 | Nakazawa |
| 5,348,814 A | 9/1994 | Niikura et al. |
| 5,360,679 A | 11/1994 | Buswell et al. |
| 5,366,819 A | 11/1994 | Hartvigsen et al. |
| 5,441,821 A | 8/1995 | Merritt et al. |
| 5,453,146 A | 9/1995 | Kemper |
| 5,470,360 A | 11/1995 | Sederquist |
| 5,498,487 A | 3/1996 | Ruka et al. |
| 5,501,914 A | 3/1996 | Satake et al. |
| 5,505,824 A | 4/1996 | Mcelroy |
| 5,516,344 A | 5/1996 | Corrigan |
| 5,527,631 A | 6/1996 | Singh et al. |
| 5,532,072 A | 7/1996 | Spaeh et al. |
| 5,573,867 A | 11/1996 | Zafred et al. |
| 5,601,937 A | 2/1997 | Isenberg |
| 5,641,585 A | 6/1997 | Lessing et al. |
| 5,686,196 A | 11/1997 | Singh et al. |
| 5,688,610 A | 11/1997 | Spaeh et al. |
| 5,693,201 A | 12/1997 | Hsu et al. |
| 5,730,213 A | 3/1998 | Kiser et al. |
| 5,733,675 A | 3/1998 | Dederer et al. |
| 5,741,605 A | 4/1998 | Gillett et al. |
| 5,763,114 A | 6/1998 | Khandkar et al. |
| 5,914,200 A | 6/1999 | Schabert et al. |
| 5,955,039 A | 9/1999 | Dowdy |
| 6,013,385 A | 1/2000 | Dubose |
| 6,051,125 A | 4/2000 | Pham et al. |
| 6,080,500 A | 6/2000 | Fuju et al. |
| 6,106,964 A | 8/2000 | Voss et al. |
| 6,106,967 A | 8/2000 | Virkar et al. |
| 6,280,865 B1 | 8/2001 | Eisman et al. |
| 6,329,090 B1 | 12/2001 | McElroy et al. |
| 6,348,278 B1 | 2/2002 | Lapierre et al. |
| 6,376,111 B1 | 4/2002 | Mathias et al. |
| 6,383,670 B1 | 5/2002 | Edlund et al. |
| 6,403,245 B1 | 6/2002 | Hunt |
| 6,436,562 B1 | 8/2002 | Dubose |
| 6,451,466 B1 | 9/2002 | Grasso et al. |
| 6,531,243 B2 | 3/2003 | Thom |
| 6,582,842 B1 | 6/2003 | King |
| 6,623,880 B1 | 9/2003 | Geisbrecht et al. |
| 6,656,625 B1 | 12/2003 | Thompson et al. |
| 6,749,958 B2 | 6/2004 | Pastula et al. |
| 6,797,425 B2 | 9/2004 | Blanchet |
| 6,821,663 B2 | 11/2004 | McElroy |
| 6,924,053 B2 | 8/2005 | McElroy |
| 7,067,208 B2 | 6/2006 | Gottmann et al. |

(56) References Cited

U.S. PATENT DOCUMENTS

| | | |
|---|---|---|
| 7,422,810 B2 | 9/2008 | Venkataraman et al. |
| 7,713,649 B2 | 5/2010 | Hickey et al. |
| 8,241,801 B2 | 8/2012 | Valensa et al. |
| 2001/0049035 A1 | 12/2001 | Haltiner, Jr. |
| 2001/0049039 A1 | 12/2001 | Haltiner, Jr. |
| 2002/0006535 A1 | 1/2002 | Woods et al. |
| 2002/0028362 A1 | 3/2002 | Prediger et al. |
| 2002/0058175 A1 | 5/2002 | Ruhl |
| 2002/0106544 A1 | 8/2002 | Noetzel et al. |
| 2002/0142208 A1 | 10/2002 | Keefer et al. |
| 2002/0192516 A1 | 12/2002 | Tajima |
| 2003/0003337 A1 | 1/2003 | Scartozzi et al. |
| 2003/0031904 A1 | 2/2003 | Haltiner |
| 2003/0049502 A1 | 3/2003 | Dickman et al. |
| 2003/0087138 A1* | 5/2003 | Margiott .............. B01J 19/0006 429/420 |
| 2003/0113598 A1 | 6/2003 | Chow et al. |
| 2003/0157386 A1 | 8/2003 | Gottmann et al. |
| 2003/0162067 A1 | 8/2003 | McElroy |
| 2003/0196893 A1 | 10/2003 | McElroy et al. |
| 2003/0205641 A1 | 11/2003 | McElroy et al. |
| 2003/0215680 A1 | 11/2003 | Lillis et al. |
| 2003/0235733 A1 | 12/2003 | Haltiner, Jr. |
| 2004/0089438 A1 | 5/2004 | Valensa et al. |
| 2004/0131912 A1 | 7/2004 | Keefer et al. |
| 2004/0180253 A1 | 9/2004 | Fisher |
| 2004/0191597 A1 | 9/2004 | McElroy |
| 2004/0191598 A1 | 9/2004 | Gottmann et al. |
| 2004/0202908 A1 | 10/2004 | Schmitz et al. |
| 2004/0202914 A1 | 10/2004 | Sridhar et al. |
| 2004/0217732 A1 | 11/2004 | Zhu et al. |
| 2004/0224193 A1 | 11/2004 | Mitlitsky et al. |
| 2004/0240161 A1 | 12/2004 | Miller et al. |
| 2005/0026011 A1 | 2/2005 | Suzuki et al. |
| 2005/0048334 A1 | 3/2005 | Sridhar et al. |
| 2005/0048336 A1 | 3/2005 | Takabe et al. |
| 2005/0048338 A1 | 3/2005 | Kobayashi et al. |
| 2005/0056412 A1 | 3/2005 | Reinke et al. |
| 2005/0164051 A1 | 7/2005 | Venkataraman et al. |
| 2005/0170235 A1 | 8/2005 | Hu et al. |
| 2005/0249988 A1 | 11/2005 | Pearson |
| 2006/0147771 A1 | 7/2006 | Russel et al. |
| 2006/0188763 A1 | 8/2006 | Bai et al. |
| 2006/0210841 A1 | 9/2006 | Wallace et al. |
| 2006/0248799 A1 | 11/2006 | Bandhauer et al. |
| 2006/0251934 A1 | 11/2006 | Valensa et al. |
| 2006/0251939 A1 | 11/2006 | Bandhauer et al. |
| 2006/0251940 A1 | 11/2006 | Bandhauer et al. |
| 2006/0286416 A1 | 12/2006 | Willets et al. |
| 2007/0017368 A1 | 1/2007 | Levan et al. |
| 2007/0017369 A1 | 1/2007 | Levan et al. |
| 2007/0196704 A1 | 8/2007 | Valensa et al. |
| 2007/0243435 A1 | 10/2007 | Dutta |
| 2008/0038622 A1 | 2/2008 | Valensa et al. |
| 2008/0096087 A1 | 4/2008 | Kulakov |
| 2008/0213141 A1 | 9/2008 | Pinchot |

FOREIGN PATENT DOCUMENTS

| | | |
|---|---|---|
| EP | 0398111 A1 | 11/1990 |
| EP | 0817298 A1 | 1/1998 |
| EP | 0977294 B1 | 2/2000 |
| EP | 1501146 A2 | 1/2005 |
| JP | 60-235365 | 11/1985 |
| JP | 62-115673 A | 5/1987 |
| JP | 05-047408 A | 2/1993 |
| JP | 2005-044727 A | 2/2005 |
| JP | 2006-032290 A | 2/2006 |
| JP | 2006-221854 A | 8/2006 |
| WO | WO1994/018712 A1 | 8/1994 |
| WO | WO2004/013258 A1 | 2/2004 |
| WO | WO2004/092756 | 10/2004 |
| WO | WO2004/093214 | 10/2004 |

OTHER PUBLICATIONS

Haynes International High-Temperature Alloys, "Haynes (Reg.) 230(TM) alloy", 2004, pp. 1-27.

International Search Report & Written Opinion, International Application No. PCT/US2007/08224, dated Nov. 26, 2008, 10 pgs.

International Search Report, International Application No. PCT/US2003/04808, dated Aug. 19, 2003, 9pgs.

Supplementary European Search Report, International Application No. PCT/US2003/04808, dated Jun. 2, 2008, 3pgs.

International Search Report & Written Opinion, International Application No. PCT/US2010/027899, dated Oct. 20, 2010, 11pgs.

International Preliminary Report on Patentability, International Application No. PCT/US2010/027899, dated Sep. 20, 2011, 6pgs.

"Powder Metallurgy Design Manual," 3rd Edition, copyright Metal Powder Industries Federation, 1998.

International Search Report and Written Opinion, Application No. PCT/US2012/065508, dated Apr. 14, 2011.

International Preliminary Report on Patentability, Application No. PCT/US2012/065508, dated May 30, 2014.

International Preliminary Report on Patentability, Application No. PCT/US2012/065531, dated May 30, 2014.

Anonymous, Presentation of the LabView-based software used in the Fuel Cell Technologies Testing System. Internet Article, Jul. 15, 2004, http://web.archive.org/web/20040715025135/fuelcelltechnologies.com/Support/Downloads/Tutorial.pdf.

Hamburger, R. O., et al., "LabView DSC Automates Fuel Cell Catalyst Research", Nov. 4, 2004, http://web.archive.org/web/20041104200039/http://bloomy.com/newsletters/fuelcellresearch.pdf.

Austin, "Cell and Stack Construction: Low-Temperature Cells," *Fuel Cells: A Review of Government-Sponsored Research*, 1950-1964, NASA SP-120, pp. 101-102, (1967).

"Low Cost, High Efficiency Reversible Fuel Cell (and Electrolyzer) Systems," (Technology Management Inc.), Proceedings of the 2001 DOE Hydrogen Program Review NREL/CP-570-30535, pp. 1-7, (2001).

Milliken et al., "Low Cost, High Efficiency Reversible Fuel Cell Systems," Proceedings of the 2002 U.S. DOE Hydrogen Program Review, NREL/CP-610-32405, pp. 1-14, (2002).

Mitlitsky, et al., "Regenerative Fuel Cells for High Altitude Long Endurance Solar Powered Aircraft," Intersociety Energy Conversion Engineering Conference (IECEC), UCRL-JC-113485, pp. 1-8, (Jul. 28, 1993).

Mitlitsky et al., "Unitized Regenerative Fuel Cells for Solar Rechargeable Aircraft and Zero Emission Vehicles," 1994 Fuel Cell Seminar, UCRL-JC-117130, pp. 1-7, (Sep. 6, 1994).

Ruhl, "Low Cost Reversible Fuel Cell System," Proceedings of the 2000 U.S. DOE Hydrogen Program Review, NREL/CP-570-28890, pp. 1-9, (Jun. 15, 2000).

"Small, Ultra Efficient Fuel Cell Systems," (Technology Management Inc.), Advanced Technology Program ATP 2001 Competition, pp. 1-2, (Jun. 2002).

Office Action received in U.S. Appl. No. 11/503,699, dated Mar. 19, 2009.

International Search Report, International Application No. PCT/US2007/074835.

Supplementary European Search Report, Application No. EP07716860, dated Jun. 7, 2010.

International Preliminary Report on Patentability, Application No. PCT/US2010/041238, dated Jan. 19, 2012, 6pgs.

International Search Report and Written Opinion, Application No. PCT/US2010/041238, dated Mar. 2, 2011, 9pgs.

Japanese Patent Office, Application No. 2008-552342, Office Action dated Aug. 28, 2012.

* cited by examiner

MODULAR FUEL CELL SYSTEM

CROSS-REFERENCE TO RELATED PATENT APPLICATIONS

This application is a continuation of U.S. patent application Ser. No. 11/656,006, filed Jan. 22, 2007, which claims priority to U.S. Provisional Patent Application No. 60/760,933, filed Jan. 23, 2006, the entire contents of both of which are incorporated herein by reference in their entirety.

BACKGROUND OF THE INVENTION

The present invention relates generally to the field of fuel cell systems and more particularly to a modular fuel cell system and method of operating same.

SUMMARY OF THE INVENTION

Fuel cells are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input. A large number of prior art fuel cell systems are configured to either have a narrow power generation range or a single operating point. In order to achieve installations of different generation capacities, multiples of these systems are installed, which increases the overall cost and complexity.

DETAILED DESCRIPTION OF THE PREFERRED EMBODIMENTS

Figure 1:
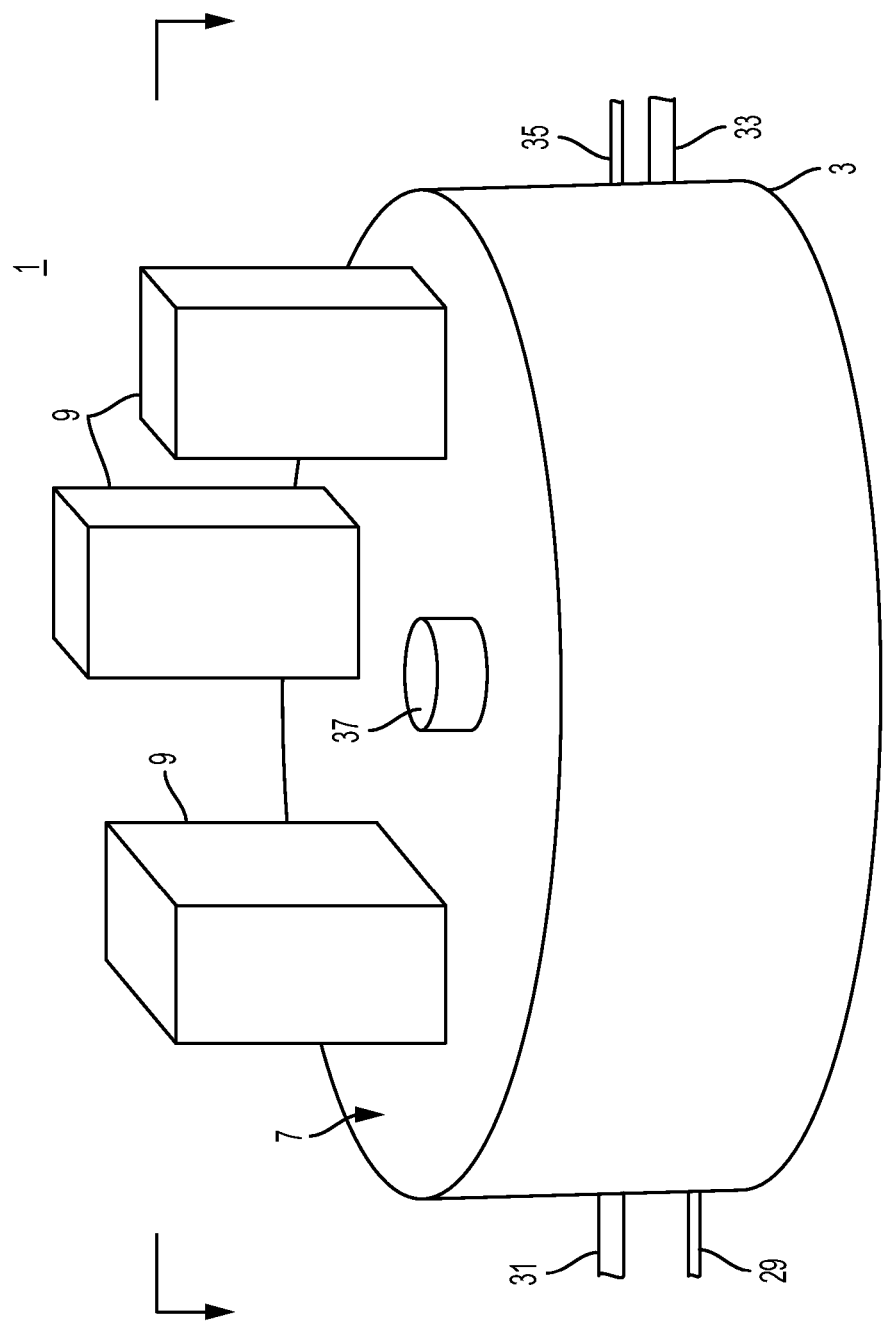
FIG. 1 is a three dimensional view of a system of the first embodiment of the invention with a cover dome removed.
Figure 2:
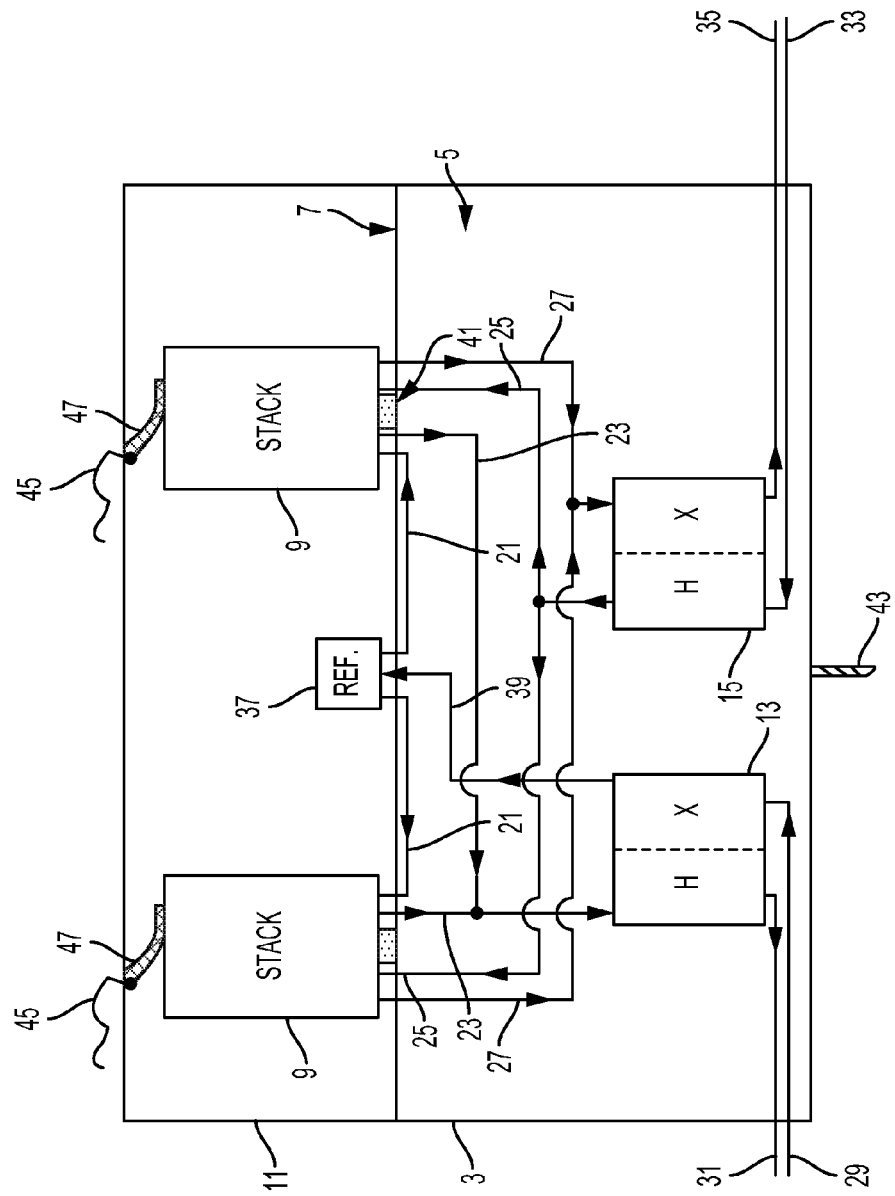
FIG. 2 is a schematic side cross sectional view of the system of the first embodiment.
Figure 3:
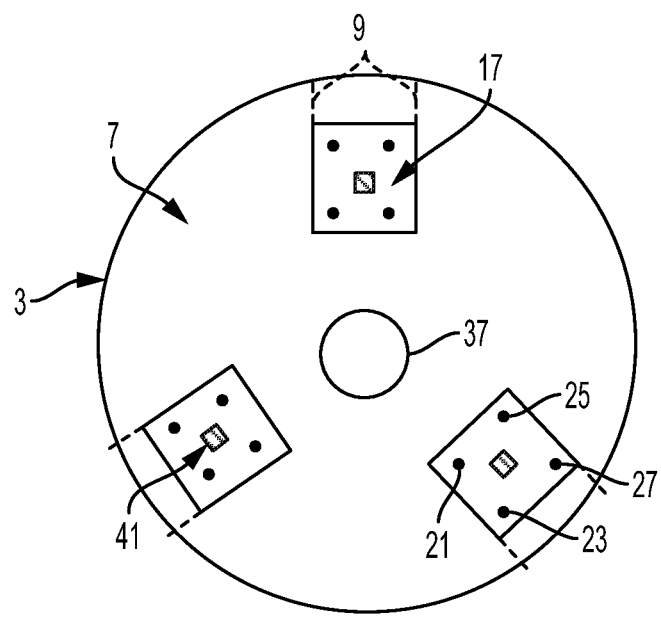
FIG. 3 is a top of view of the base of the system of the first embodiment.

The first embodiment of the invention provides a fuel cell stack module 1 which is illustrated in FIGS. 1, 2 and 3. The module 1 contains a base 3, which comprises a chamber having an interior volume 5 and an upper surface 7. The base 3 may have a cylindrical shape, with a flat upper surface and a circular cross section, as shown in FIG. 1. However, the base 3 may have any other suitable shape, such as a square, rectangular, polygonal, oval or irregular cross section.

Each fuel cell stack module 1 includes at least one fuel cell stack 9 and a cover dome 11 covering the stack(s) 9. For example, a single fuel cell stack 9 may be located under the dome 11. Alternatively, two or more stacks 9 may be located under the dome 11. The stacks 9 may be stacked vertically and/or horizontally under each dome 11. If desired, the vertically stacked fuel cell stacks 9 may be provided in a cascade configuration, where the fuel exhaust stream from one stack is used as the inlet fuel stream for an adjacent stack.

The stacks 9 may comprise any suitable fuel cells. For example, the fuel cells may comprise solid oxide fuel cells having a ceramic oxide electrolyte. Other fuel cell types, such as PEM, molten carbonate, phosphoric acid, etc. may also be used. The stacks 9 may comprise externally and/or internally manifolded stacks. For example, the stacks may be internally manifolded for fuel and air with fuel and air risers extending through openings in the fuel cell layers and/or in the interconnect plates between the fuel cells. Alternatively, the fuel cells may be internally manifolded for fuel and externally manifolded for air, where only the fuel inlet and exhaust risers extend through openings in the fuel cell layers and/or in the interconnect plates between the fuel cells. The fuel cells may have a cross flow (where air and fuel flow roughly perpendicular to each other on opposite sides of the electrolyte in each fuel cell), counter flow parallel (where air and fuel flow roughly parallel to each other but in opposite directions on opposite sides of the electrolyte in each fuel cell) or co-flow parallel (where air and fuel flow roughly parallel to each other in the same direction on opposite sides of the electrolyte in each fuel cell) configuration.

The cover dome 11 may have any suitable configuration. For example, the cover dome 11 may have a cylindrical configuration. However, the dome 11 may have a polygonal or oval horizontal cross section and/or it may have a tapered rather than flat upper surface. The dome may be made of any suitable thermally insulating or thermally conductive material, such as metal, ceramic, etc.

The stack(s) 9 and the dome 11 are removably positioned or removably connected to an upper surface 7 of the base 3. Preferably, each fuel cell stack 9 and the cover dome 11 are separately removably connected to the upper surface 7 of the base 3. In this case, the dome 11 may be easily removed from the upper surface 7 of the base 3 without removing the stack(s) 9 under the dome 11. Alternatively, if the dome 11 contains a door or a hatch, then the stack(s) 9 under the dome 11 may be easily removed through the door or hatch without removing the dome 11.

The term "removably connected" means that the stack(s) 9 and/or the dome 11 are connected to the upper surface 7 of the base 3 in such a way as to be easily removed for repair or servicing. In other words, "removably connected" is an opposite of "permanently connected". For example, the stacks 9 and/or the dome 11 are removably connected to the upper surface 7 of the base 3 by at least one of a snap fit connection, a tension fit connection, a fastening connection or a slide rail connection. An example of a snap fit connection is a bayonet type connection in which one or more prongs which hold a component in place by hooking into an opening are pressed inward or outward to unhook them from the opening. An example of a tension fit connection is where a component, such as a stack 9 or a dome 11, is pressed into an opening or groove in the surface 7 of the base 3 which has the about same size as the cross section of the stack 9 or the dome 11 such that tension holds the stack or the dome in the opening or groove. An example of a fastening connection is connection by a fastener, such as a bolt or a clip, which can be removed by service personnel. An example of a slide rail connection is a drawer or dove tail type connection, such as a groove in the upper surface 7 of the base 3 into which a protrusion in the stack 9 can be slid into, or a groove in the bottom stack 9 plate into which a protrusion in the upper surface 7 of the base 3 can be slid into. For example, as shown in FIG. 3, the upper surface 7 of the base 3 may contain openings 17 for holding the stacks 9 by tension and/or rail grooves 19 for sliding the stacks 9 into place. Other removable connection types may be used. An example of a permanent connection is a welded connection, such as where the dome 11 is welded to the surface 7 of the base.

The stack(s) 9 and the dome 11 be removably connected using a different type of connection from each other. Furthermore, in an alternative aspect of the invention, the dome 11 may be removably connected to the upper surface 7 of the base 3, while the stack(s) 9 may be non-removably connected to the same surface 7.

Preferably, at least one heat exchanger is located in the interior volume 5 of the base 3. For example, as shown in FIG. 2, for stacks which are internally manifolded for fuel and air, both fuel 13 and air 15 heat exchangers may be located in the interior volume 5 of the base 3. For stacks 9 that are internally manifolded for fuel but externally manifolded for air, the fuel heat exchanger may be located in the interior volume 5 of the base. The fuel 13 and air 15 heat exchangers provide heat from the fuel and air exhaust streams, respectively, to fuel and air inlet streams, respectively. The heat exchangers may be located side by side or stacked vertically in the interior volume 5 of the base 3. As shown in FIG. 2, there may be one fuel 13 and one air 15 heat exchanger for each module 1. However, if desired, more than one fuel 13 and/or more than one air 15 heat exchanger may be provided.

As shown in FIGS. 2 and 3, the base 3 also contains a plurality of fuel inlet conduits 21 which provide a fuel inlet stream to the fuel cell stacks 9, a plurality of fuel exhaust conduits 23 which remove the fuel exhaust stream from the stacks 9, a plurality of air inlet conduits 25 which provide an air (or other oxidizer) inlet stream to the stacks 9, and a plurality of air exhaust conduits 27 which remove the air exhaust stream from the stacks 9. A fuel cell stack 9 is removably attached to one of each conduits 21, 23, 25, 27.

As shown in FIG. 2, a fuel inlet line 29 is connected to a first inlet of the fuel heat exchanger 13. The plurality of fuel inlet conduits 21 are fluidly connected to a first outlet of the fuel heat exchanger 13. The term "fluidly connected" means either directly connected or indirectly connected such that the fuel inlet stream flows from the fuel heat exchanger 13 through one or more other components until it reaches each fuel inlet conduit 21. The plurality of fuel exhaust conduits 23 are fluidly connected to a second inlet of the fuel heat exchanger 13. A fuel exhaust line 31 is connected to a second outlet of the fuel heat exchanger. An air inlet line 33 is connected to a first inlet of the air heat exchanger 15. The plurality of air inlet conduits 25 are fluidly connected to a first outlet of the air heat exchanger 15. The plurality of air exhaust conduits 27 are fluidly connected to a second inlet of the air heat exchanger 15. An air exhaust line 35 is connected to a second outlet of the air heat exchanger 15.

If desired, an optional external fuel reformer 37 may also be provided if the fuel cells of the stacks 9 are of the external reforming type. If the fuel cells of the stacks 9 are of an internal reforming type, then the external reformer 37 may be omitted. The reformer may be located on the upper surface 7 of the base 3 under the dome 11 or inside the interior volume 5 of the base 3. If the reformer 37 is located on the upper surface 7 of the base 3, then the reformer 37 may also be removably connected to the upper surface 7 of the base 3. For example, as shown in FIG. 2, a single reformer 37 is used to reform a hydrocarbon fuel, such as natural gas or methane to a hydrogen containing fuel. A fuel conduit 39 may connect the first outlet of the fuel heat exchanger 13 with the inlet of the reformer 37. The fuel inlet conduits 21 connect the outlet of the reformer 37 with the fuel inlets of the stacks 9.

If desired, the reformer 37 may be thermally integrated with the fuel cell stacks 9. The term "thermally integrated" in this context means that the heat from the reaction in the fuel cell stacks 9 drives the net endothermic fuel reformation in the reformer 37. The reformer may be thermally integrated with one or more fuel cell stacks 9 by placing the reformer and stack(s) under the same dome 11 and/or in thermal contact with each other, or by providing a thermal conduit or thermally conductive material which connects the stack(s) to the reformer. For example, the reformer 37 may be located in close proximity to at least one fuel cell stack 9 to provide radiative and/or convective heat transfer from the stack to the reformer.

Preferably, the base 3 and the dome 11 are also used to provide an electrical connection from the stacks 9 to the power conditioning equipment. For example, the upper surface of the base may contain a plurality of electrical contacts 41, such as negative or ground electrical contacts. Each contact 41 is located where a bottom end plate of a fuel cell stack 9 would touch the upper surface 7 of the base 3. Each negative or ground electrode or end plate of each fuel cell stack 9 is electrically connected to one of the plurality of electrical contacts 41. The base 3 also contains a common electrical bus 43, such as a negative or ground bus 43, which is electrically connected to the fuel cells 9 through the contacts 41.

The dome 11 contains a separate electrical bus 45 for each stack 9. The bus 45 has a different polarity than the polarity of the common electrical bus 43. For example, the dome 11 may have a plurality of positive buses 45. A positive electrode or end plate of a fuel cell stack 9 is electrically connected to a respective positive electrical bus 45 extending from the dome 11.

The positive electrode or end plate of each fuel cell stack 9 may be electrically connected to the respective positive electrical bus 45 using any suitable contact or electrical connection. For example, as shown in FIG. 2, an upper interior surface of the dome 11 contains a plurality of electrically conductive pressure members 47. The pressure members 47 on the dome 11 are aligned with the stack 9 positions over the contacts 41 on the upper surface 7 of the base 3. Each pressure member 47 removably holds at least one fuel cell stack 9 between the cover dome 11 and the upper surface 7 of the base 3. The positive electrode or end plate of each fuel cell stack 9 is electrically connected to the positive electrical bus 45 through a respective pressure member 47. The pressure member 47 may be a flexible bar, plate or spring which puts a downward pressure on the stack 9 to keep the stack 9 firmly against the electrical contact 41 on the upper surface 7 of the base. When the dome 11 is pushed down to close the module 1, the pressure member flexes to press the stack 9 into place on the base 3. When the dome 11 is removed to service or repair the module, the pressure member releases the stack 9.

Thus, in a system comprising a plurality of modules, each module 1 may be electrically disconnected, removed from the fuel cell system and/or serviced or repaired without stopping an operation of the other modules 1 in the fuel cell system. In other words, each module 1 may be electrically disconnected, removed from the fuel cell system and/or serviced or repaired while the other modules 1 continue to operate to generate electricity. Thus, the entire fuel cell system does not have to be shut down when one stack 9 malfunctions or is taken off line for servicing.

When one module 1 is taken off line (i.e., it is turned off to be removed, repaired or serviced), while the other modules 1 continue to operate, the flow of fuel to the module 1 which is taken off line should be stopped. This may be accomplished by placing a high temperature valve in each fuel inlet line 29. The valve may be turned off manually or electronically to stop the flow of fuel through a given fuel inlet line 29, while the fuel continues to flow through the other fuel inlet lines 29 to the other modules 1.

In an alternative aspect of the invention, a heat activatable fuse is used instead of the high temperature valve to stop the flow of fuel through a given fuel inlet line. Such a fuse may be less expensive than a high temperature valve.

Figures 4A, 4B:
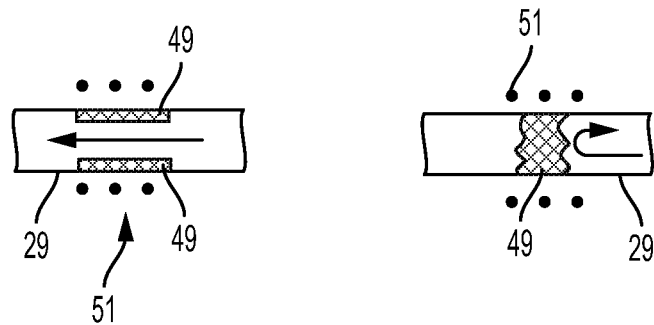
FIGS. 4A and 4B are side cross sectional views of a conduit before and after a fuse is melted, respectively.

As shown in FIG. 4A, the fuse comprises a low melting point material cladding 49 located inside the fuel inlet line 29 and an electric heating element 51 which is adapted to heat and melt the cladding 49 to seal the fuel inlet line 29. The fuel inlet line 29 may comprise any suitable fluid conduit, such as a pipe. For example, the cladding 49 may be located on one or more interior walls of the conduit such that the fuel inlet stream may flow through the conduit 29 around the cladding 49. The cladding may comprise any suitable material which has a higher melting point than the fuel inlet stream temperature, but much lower melting point than that of the conduit 29, such that the heating element 51 can only melt the cladding 49 but not the conduit 29. The heating element may comprise any suitable resistance-type or other type (such as optical-type or RF-type) heating element, such as a nichrome wire wrapped around the outside the portion of the conduit 29 containing the cladding 49. As shown in FIG. 4B, when a current is passed through the heating element 51, the cladding 49 melts to seal the conduit 29 and to stop the flow of the fuel through the conduit 29 without melting the conduit 29. The conduit 29 may be easily replaced once its respective module 1 is repaired or serviced.

Thus, a method of sealing a fluid conduit includes heating a cladding 49 of a first material located inside the conduit 29 of a second material having a higher melting point than the first material to melt the cladding 49 such that the melted cladding seals the conduit 29. While a fuel inlet line for a fuel cell system is used as an example, the fuse may be used to seal any other liquid or gas carrying conduit, such as a pipe or channel, used in any other suitable device.

The second embodiment of the invention provides a modular design for the entire fuel cell system rather than just for the fuel cell stack modules. The modular system design provides flexible installation and operation. Modules allow scaling of installed generating capacity, reliable generation of power, flexibility of fuel processing, and flexibility of power output voltages and frequencies with a single design set. The modular design results in an "always on" unit with very high availability and reliability. This design also provides an easy means of scale up and meets specific requirements of customer's installations. The modular design also allows the use of available fuels and required voltages and frequencies which may vary by customer and/or by geographic region. Thus, in summary, since the fuel cell system is designed as a modular set, it can be installed to accommodate the requirements of different customers and the elements of the system are able to work in concert to achieve a very high system reliability and availability.

Figure 5:
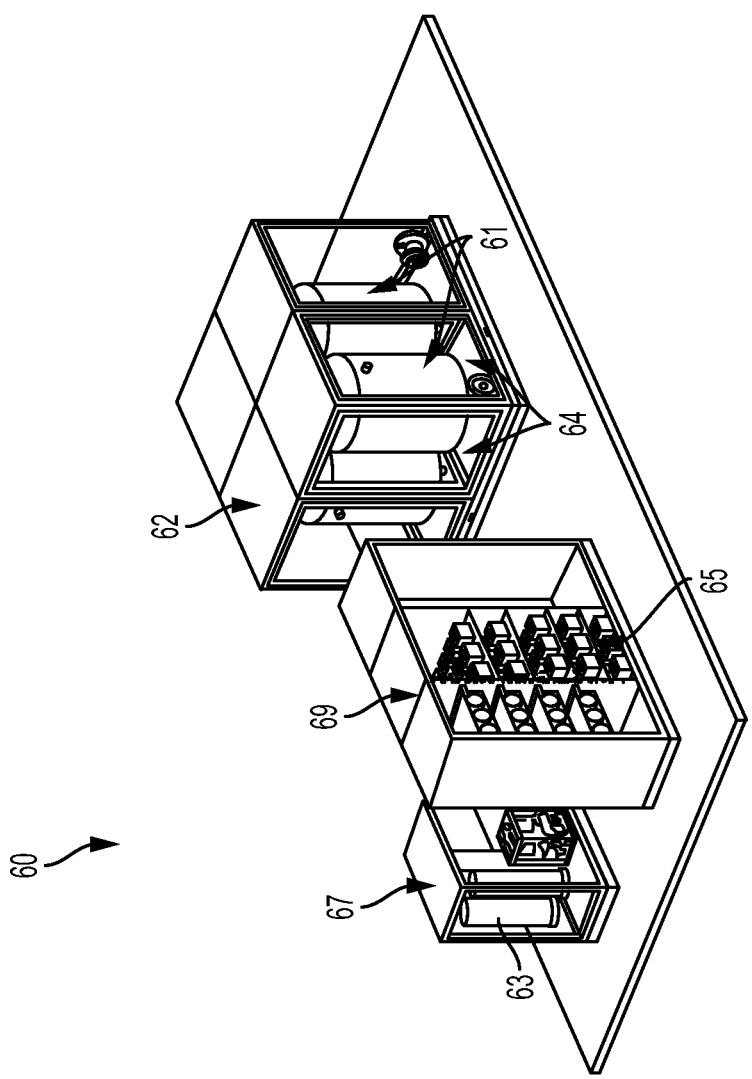
FIG. 5 is a three dimensional view of a system of the second embodiment of the invention

FIG. 5 shows an exemplary configuration of the modular fuel cell system 60. The system 60 includes the following elements. The system 60 includes a plurality of fuel cell stack modules 61. These modules 61 are devices which contain the components used for generating DC power from a readily reformed fuel stream.

In one aspect of the second embodiment, each fuel cell stack module 61 is the same as the module 1 of the first embodiment. Thus, each module 61 shown in FIG. 5 may comprise a base 3, a cover dome 11 and one or more fuel cell stacks 9, as shown in FIG. 2. For example, for a high temperature fuel cell system, such as a SOFC or a molten carbonate fuel cell system, each fuel cell stack module 61 is the same as the module 1 of the first embodiment. In an alternative aspect of the second embodiment, each module 61 may comprise one base 3 and a plurality of fuel cell stacks 9 covered by a plurality of cover domes 11. Alternatively, each module 61 may have a different structure or configuration from the modules 1 of the first embodiment. For example, for low temperature fuel cell systems, such as PEM systems, each module 61 can be different from the module 1 of the first embodiment. Thus, the system of the second embodiment is applicable to high and low temperature fuel cell stack modules.

Each module 61 contains at least one fuel cell stack 9. As discussed with respect to the first embodiment, multiple fuel cell stack modules 61 may be installed in a clustered installation, such as for example, in a single hot box 62. A failure of a single fuel cell stack module 61 results only in a slightly degraded output capacity or slightly degraded system efficiency because the remaining fuel cell stack modules 61 continue operation.

The system 60 also contains one or more fuel processing modules 63. These modules are devices which contain the components used for pre-processing of fuel so that it can be readily reformed. The fuel processing modules 61 may be designed to process different sets of fuels. For example, a diesel fuel processing module, a natural gas fuel processing module, and an ethanol fuel processing module may be provided. The processing modules 63 may processes at least one of the following fuels selected from natural gas from a pipeline, compressed natural gas, propane, liquid petroleum gas, gasoline, diesel, home heating oil, kerosene, JP-5, JP-8, aviation fuel, hydrogen, ammonia, ethanol, methanol, syngas, bio-gas, bio-diesel and other suitable hydrocarbon or hydrogen containing fuels. If desired, the reformer 37 may be located in the fuel processing module 63. Alternatively, if it is desirable to thermally integrate the reformer 37 with the fuel cell stack(s) 9, then the reformer(s) 37 may be located in the fuel cell stack module(s) 61. Furthermore, if internally reforming fuel cells are used, then the external reformer 37 may be omitted entirely.

The system 60 also contains one or more power conditioning modules 65. These modules 65 are devices which contain the components for converting the DC power to AC power, connecting to the grid, and managing transients. The power conditioning modules 65 may be designed convert the DC power from the fuel cell modules 61 to different AC voltages and frequencies. Designs for 208V, 60 Hz; 480V, 60 Hz; 415V, 50 Hz and other common voltages and frequencies may be provided.

Each type of module 61, 63, 65 may be installed in or on a separate container, such as a box, rack or platform. Thus, the containers may be located separately from each other, and may be moved, repaired or serviced separately. For example, as shown in FIG. 5, the fuel cell stack modules 61 are located in a common hot box 62. The fuel processing module or modules 63 may be located in a separate box 67. The power conditioning module or modules 65 may be located on a separate rack 69.

Additionally, the modular system 60 may be configured in a way to ease servicing of the system. All of the routinely or high serviced components (such as the consumable components) may be placed in a single module to reduce amount of time required for the service person. For example, the purge gas and desulfurizer material for a natural gas system may be placed in a single module. This would be the only module accessed during routine maintenance. Thus, each module 61, 63, 65 may be serviced, repaired or removed from the system without opening the container in which the other modules are located and without servicing, repairing or removing the other modules. In other words, at least one module can be taken off line without taking the remaining modules off line. For example, the system can include a plurality of fuel cell stack modules 61. When at least one fuel cell stack module 61 is taken off line, the remaining fuel cell stack modules 61, the fuel processing module(s) 63 and the power conditioning module(s) 65 are not taken off line. Furthermore, the system may contain a plurality of each type of module 61, 63, 65. When at least one module of a particular type is taken off line, the remaining modules of the same type are not taken off line.

Furthermore, if desired, the system may be configured such that one of several optional modules is selected for each of fuel processing, fuel cell, and power conditioning. Thus, before or after the system is installed to generate power, the fuel processing modules may be interchanged without modification to the fuel cell modules or to the power conditioning modules, while the power conditioning modules may be interchanged without modification to the fuel cell modules or to the fuel processing modules.

If desired, the system may include a single user interface, such as a computer or other suitable control terminal or panel. The user interface allows the operator to control or operate all of the modules of the system from a single location. However, if desired, each type of module may have a separate user interface as a back-up or for separate control of the module.

In one aspect of the second embodiment, the system 60 contains four fuel cell stack modules 61 in the hot box 62. Each fuel cell stack module 61 may be designed to have ¼ the capacity of the total modules 61 in the system 60. Each module 61 may be designed to have two-side access and also to be "indexed" allowing four fuel cell stack modules 61 to be placed in 90-degree rotations in a single installation. For example, the hot box 62 may have doors 64 on two or more adjacent sides. When both adjacent doors of the hot box are open, a module 61 located in that corner of the hot box can be accessed from two sides for service or repair. To access one of the other three modules though the open doors, the base or stage below the modules 61 is rotated 90 degrees.

For example, when each module 61 is a 25 kW module, a set of four modules provides a densely populated 100 kW system. Larger systems could use this same configuration where individual fuel cell modules have a 100 kW capacity and a clustered installation of four such modules would have 400 kW capacity.

While four modules 61 and a four sided hot box 62 are illustrated in FIG. 5, it should be understood that the system 60 may contain less than four or more than four modules 61. Furthermore, the hot box 62 may have five or more sides or it may have a cylindrical or oval shape. Furthermore, the hot box 62 may have more than two doors and may have a door on each side.

The system 60 provides a high system reliability and availability. Because the clustered system continues to generate power when there is a failure of a single generation module, the reliability of the system as a whole is quite high. The system 60 also provides a flexibility for installation. The fuel cell system can be tailored to fit the specific requirements of a large variety of installations because many options for fuel processing and power conditioning are provided.

The system also allows a low cost, high volume fuel cell module production. Because the fuel cell stack module 61 is designed as a common element of the clustered system, it does not need to be substantially modified in order to accommodate different fuels or different output voltages or frequencies. These modifications are accommodated in the fuel processing 63 or power conditioning 65 modules. Because of the single fuel cell module design, engineering costs are minimized. Examples of these costs include characterization testing, reliability testing, environmental testing, and certification type testing.

The system also provides a module upgrading capability. By dividing the system functionality into discrete modules, the system may be upgraded as new versions of the product are made available. These upgrades may be made by replacing individual modules instead of the entire product. Thus the cost of such upgrades is minimized. Furthermore, capacity upgrades can be made by adding fuel cell modules. Fuel flexibility upgrades can be made by adding or changing fuel processing module.

The system also provides a flexibility in module sizes. The fuel cell module subsystem and the power conditioning subsystem can be based on modules of different sizes. For instance, fuel cell module subsystem can be based on 25 kW modules while the power conditioning subsystem can be based on 100 kW modules. The architecture can have enough redundancy to avoid single point failures.

The system also provides an ease of design and testing for product certification to accepted design standards. By placing fuel cell and fuel processing components in separate modules, the gas handling requirements of these modules need not be applied to the power conditioning module. Likewise, the high voltage requirements of the power conditioning module need not be applied to the fuel cell and fuel processing modules.

The modular fuel cell systems of the first and the second embodiments may contain the components described and illustrated below with respect to the third, fourth, fifth or sixth embodiments. However, it should be noted that the fuel cell systems may contain different components and configurations than those described and illustrated with respect to the third, fourth, fifth or sixth embodiments below. The third, fourth, fifth and sixth embodiments describe and illustrate a schematic of various fuel cell systems, such as a solid oxide fuel cell system, where the fuel exhaust stream is separated into two streams and one of the streams is recycled into the fuel inlet stream. It should be noted that fuel cell systems other than solid oxide fuel cell systems may also be used.

In the system of the third embodiment, a portion of the fuel cell stack fuel exhaust stream is directly recycled into the fuel inlet stream. Another portion of the fuel cell stack fuel exhaust stream is provided into a partial pressure adsorption apparatus, and the separated hydrogen is then recycled into the fuel inlet stream and/or is provided to a hydrogen storage vessel or to a hydrogen using device.

Figure 6:
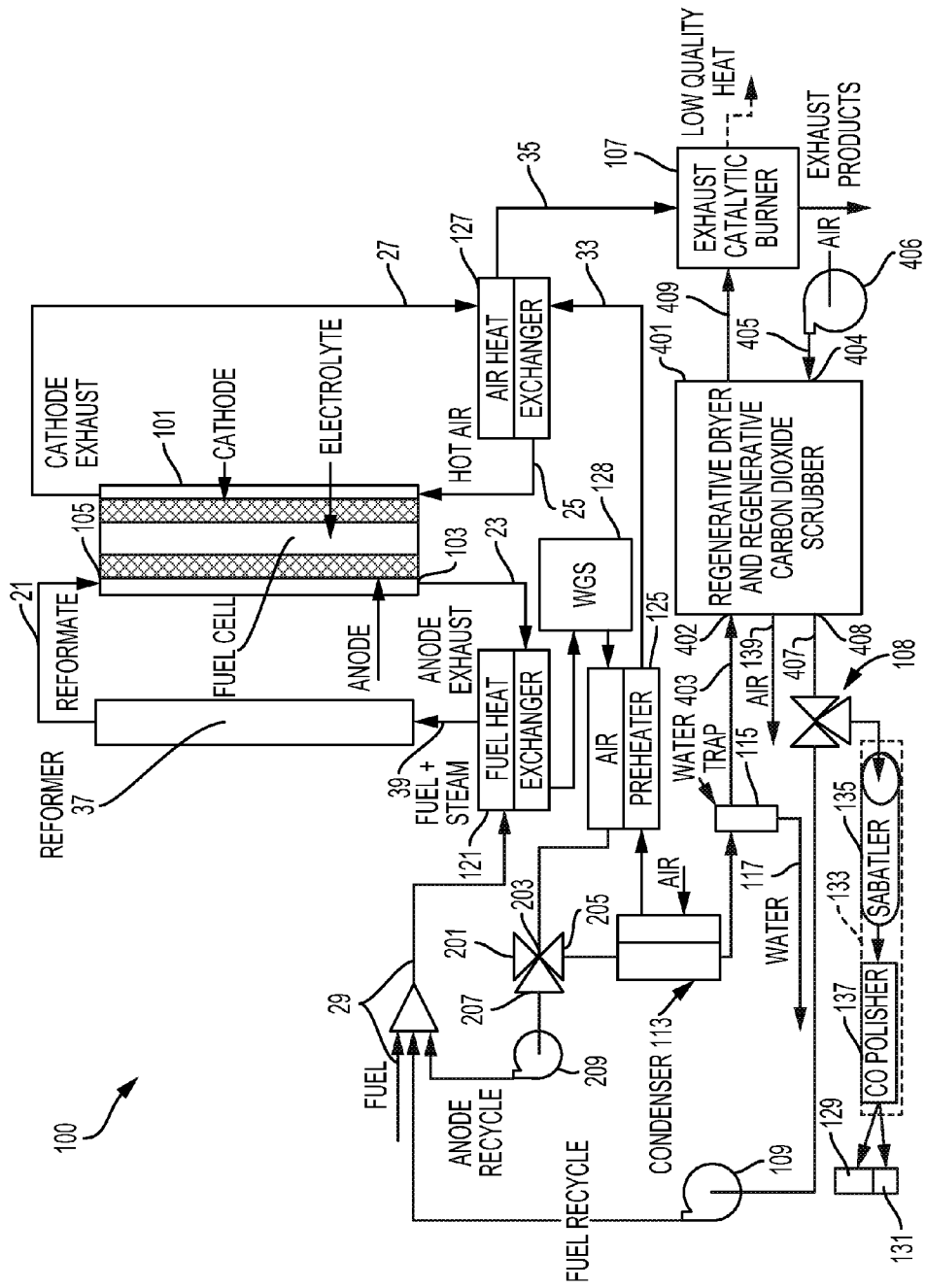
FIGS. 6, 7 and 8 are schematic diagrams of fuel cell systems of the embodiments of the invention.

FIG. 6 illustrates a fuel cell system 100 of the third embodiment. The system 100 contains a fuel cell stack 101, such as a solid oxide fuel cell stack (illustrated schematically to show one solid oxide fuel cell of the stack containing a ceramic electrolyte, such as yttria stabilized zirconia (YSZ) or scandia stabilized zirconia (SSZ), an anode electrode, such as a nickel-YSZ or Ni-SSZ cermet, and a cathode electrode, such as lanthanum strontium manganite (LSM)). It should be noted that the stack 101 may correspond to one of the stacks 9 located in the fuel cell stack module 1 of the first embodiment.

The system also contains a partial pressure swing adsorption ("PPSA") unit 401 comprising a plurality of adsorbent beds (not shown for clarity). The PPSA unit 401 acts as a regenerative dryer and carbon dioxide scrubber. The PPSA unit 401 is described in U.S. patent application Ser. Nos. 10/188,118 and 10/188,120, both filed on Jul. 25, 2005 and both incorporated herein by reference in their entirety.

The system 100 also contains the first conduit 403 which operatively connects a fuel exhaust outlet 103 of the fuel cell stack 101 to a first inlet 402 of the partial pressure swing adsorption unit 401. For example, the first inlet 402 may comprise a feed valve and/or an inlet to one of the adsorbent beds. The system 100 also contains the second conduit 405 which operatively connects a purge gas source, such as a dried or atmospheric air source 406 to a second inlet 404 of the partial pressure swing adsorption unit 401. The purge gas source 406 may comprise an air blower or compressor and optionally a plurality of temperature swing cycle adsorption beds.

The system also contains a third conduit 407 which operatively connects an outlet 408 of the partial pressure swing adsorption unit 401 to the hydrogen storage vessel or to the hydrogen using device. If desired, the third conduit 407 also operatively connects an outlet 408 of the partial pressure swing adsorption unit 401 to a fuel inlet 105 of the fuel cell stack 101, as will be described in more detail below. Preferably, the system 100 lacks a compressor which in operation compresses the fuel cell stack fuel exhaust stream to be provided into the partial pressure swing adsorption unit 401.

The system 100 also contains the fourth conduit 409 which removes the exhaust from the unit 401. The conduit 409 may be connected to a catalytic burner 107 or to an atmospheric vent. Optionally, the burner 107 may also be operatively connected to the stack fuel exhaust outlet 103 to provide a portion of the fuel exhaust stream into the burner 107 to sustain the reaction in the burner.

The system 100 also contains an optional selector valve 108, such as a multi-way valve, for example a three-way valve. The selector valve 108 has an inlet operatively connected to an outlet of the partial pressure swing adsorption unit 401, a first outlet operatively connected to the hydrogen storage vessel or to the hydrogen using device, and a second outlet operatively connected to a fuel inlet 105 of the fuel cell stack 101. In operation, the valve 108 divides the hydrogen containing stream provided from the PPSA unit 401 into a first stream, which is provided into the hydrocarbon fuel inlet stream, and a second stream which is provided to the hydrogen storage vessel or to the hydrogen using device. However, the valve 108 may be omitted and the system 100 may be configured to provide the entire hydrogen containing stream into the hydrocarbon fuel inlet stream, or to the hydrogen storage vessel or to the hydrogen using device, if such optional vessel or device are connected to the system 100.

Preferably, the second outlet of the selector valve 108 is operatively connected to the fuel inlet line 29 of the fuel cell stack 101 via a blower or a heat driven compressor 109. The device 109 has an inlet which is operatively connected to the partial pressure swing adsorption unit 401 (via the selector valve 108) and an outlet which is operatively connected to a fuel inlet 105 of the fuel cell stack 101. For example, conduit 407 connects the blower or compressor 109 to the unit 401 via the selector valve 108. In operation, the blower or compressor 109 controllably provides a desired amount of hydrogen and carbon monoxide separated from a fuel cell stack fuel exhaust stream into the fuel cell stack fuel inlet stream. Preferably, the device 109 provides the hydrogen and carbon monoxide into a fuel inlet line 29 which is operatively connected to the a fuel inlet 105 of the fuel cell stack 101. Alternatively, the device 109 provides the hydrogen and carbon monoxide directly into the fuel inlet 105 of the fuel cell stack 101.

The system 100 also contains a condenser 113 and water separator 115 having an inlet which is operatively connected to a fuel cell stack fuel exhaust 103 and an outlet which is operatively connected to an inlet 402 of the partial pressure swing adsorption unit 401. The condenser 113 and water separator 115 may comprise a single device which condenses and separates water from the fuel exhaust stream or they may comprise separate devices. For example, the condenser 113 may comprise a heat exchanger where the fuel exhaust stream is cooled by a cool counter or co-flow air stream to condense the water. The air stream may comprise the air inlet stream into the fuel cell stack 101 or it may comprise a separate cooling air stream. The separator 115 may comprise a water tank which collects the separated water. It may have a water drain 117 used to remove and/or reuse the collected water.

The system 100 also contains a recuperative heat exchanger 121 which exchanges heat between the stack fuel exhaust stream and the hydrocarbon fuel inlet stream being provided from the inlet line 29. The heat exchanger 121 may be the same as the fuel heat exchanger 13 of the first embodiment. The heat exchanger helps to raise the temperature of the fuel inlet stream and reduces the temperature of the fuel exhaust stream so that it may be further cooled in the condenser and such that it does not damage the humidifier.

If the fuel cells are external fuel reformation type cells, then the system 100 contains a fuel reformer 37. The reformer 37 reforms a hydrocarbon fuel inlet stream into hydrogen and carbon monoxide containing fuel stream which is then provided into the stack 101. The reformer 37 may be heated radiatively, convectively and/or conductively by the heat generated in the fuel cell stack 101 and/or by the heat generated in an optional burner/combustor, as described in U.S. patent application Ser. No. 11/002,681, filed Dec. 2, 2004, incorporated herein by reference in its entirety. Alternatively, the external reformer 37 may be omitted if the stack 101 contains cells of the internal reforming type where reformation occurs primarily within the fuel cells of the stack.

Optionally, the system 100 also contains an air preheater heat exchanger 125. This heat exchanger 125 heats the air inlet stream being provided to the fuel cell stack 101 using the heat of the fuel cell stack fuel exhaust. If desired, this heat exchanger 125 may be omitted.

The system 100 also preferably contains an air heat exchanger 127. The heat exchanger 127 may be the same as the air heat exchanger 15 of the first embodiment. This heat exchanger 127 further heats the air inlet stream being provided to the fuel cell stack 101 using the heat of the fuel cell stack air (i.e., oxidizer or cathode) exhaust. If the preheater heat exchanger 125 is omitted, then the air inlet stream is provided directly into the heat exchanger 127 by a blower or other air intake device.

The system may also contain an optional water-gas shift reactor 128. The water-gas shift reactor 128 may be any suitable device which converts at least a portion of the water and carbon monoxide in the fuel exhaust stream into free hydrogen and carbon dioxide. For example, the reactor 128 may comprise a tube or conduit containing a catalyst which converts some or all of the carbon monoxide and water vapor in the fuel exhaust stream into carbon dioxide and hydrogen. Thus, the reactor 128 increases the amount of hydrogen in the fuel exhaust stream. The catalyst may be any suitable catalyst, such as a iron oxide or a chromium promoted iron oxide catalyst. The reactor 128 may be located between the fuel heat exchanger 121 and the air preheater heat exchanger 125.

Optionally, the system 100 is operatively connected to a hydrogen storage vessel 129 or a hydrogen using device 131. However, the vessel 129 or device 131 may be omitted and the system 100 may be used to only produce electricity rather than electricity and hydrogen together. The hydrogen storage vessel may comprise a hydrogen storage tank or a hydrogen dispenser. The vessel may contain a conduit leading to a hydrogen using device which is used in transportation, power generation, cooling, hydrogenation reactions, or semiconductor manufacture. For example, the system 100 may be located in a chemical or a semiconductor plant to provide primary or secondary (i.e., backup) power for the plant as well as hydrogen for use in hydrogenation (i.e., passivation of semiconductor device) or other chemical reactions which require hydrogen that are carried out in the plant.

The hydrogen using device 131 may also comprise another fuel cell system (such as a fuel cell stack), such as low temperature fuel cell system, such as a proton exchange membrane (PEM) fuel cell system, which uses hydrogen as a fuel. Thus, the hydrogen from the system 100 is provided as fuel to one or more additional fuel cells 131. For example, the system 100 may be located in a stationary location, such as a building or an area outside or below a building and is used to provide power to the building. The additional fuel cells 131 may be located in vehicles located in a garage or a parking area adjacent to the stationary location. A vehicle may comprise a car, sport utility vehicle, truck, motorcycle, boat or any other suitable fuel cell powered vehicle. In this case, the hydrocarbon fuel is provided to the system 100 to generate electricity for the building and to generate hydrogen which is provided as fuel to the fuel cell system 131 powered vehicles. The generated hydrogen may be stored temporarily in the hydrogen storage vessel 129 and then provided from the storage vessel to the vehicle fuel cells 131 on demand (analogous to a gas station) or the generated hydrogen may be provided directly from the system 100 to the vehicle fuel cells 131 through a conduit.

The system 100 may contain an optional hydrogen conditioner. The hydrogen conditioner may be any suitable device which can purify, dry, compress (i.e., a compressor), or otherwise change the state point of the hydrogen-rich gas stream provided from the PPSA unit 401. If desired, the hydrogen conditioner may be omitted.

The hydrogen using device 131 may comprise a PEM fuel cell system or another similar device which is generally carbon monoxide intolerant. Thus, carbon monoxide has to be scrubbed (i.e., removed by gas separation and/or chemical reaction) from the hydrogen rich stream being provided from the PPSA unit 401 before the hydrogen rich stream is provided into the PEM fuel cells located in a vehicle or into another CO intolerant device 131.

In this case, the system 100 contains an optional carbon monoxide scrubbing device 133. The device 133 contains an inlet operatively connected to an outlet of the partial pressure swing adsorption unit 401 and an outlet operatively connected to a PEM fuel cell system 131 located in a vehicle. In operation, the carbon monoxide scrubbing device 133 scrubs carbon monoxide being provided with the hydrogen from the partial pressure swing adsorption unit 401 and provides the hydrogen either directly or indirectly to the PEM fuel cell system 131.

The carbon monoxide scrubbing device 133 may comprise any device which removes carbon monoxide from the hydrogen rich stream by adsorption, chemical reaction and/or any other suitable method. The device 133 may comprise a pressure swing adsorption unit and/or a Sabatier reactor. For example, as shown in FIG. 6, the scrubbing device comprises a Sabatier reactor 135 and a carbon monoxide polisher 137. The Sabatier reactor comprises a tube or another container which contains a catalyst, such as a platinum family metal on an alumina support. Preferably, the catalyst comprises ruthenium. A gas mixture consisting primarily of hydrogen and carbon monoxide is introduced into reactor tube from the PPSA system 401 and contacts the catalyst therein. The gas mixture undergoes an immediate exothermic reaction and converts the carbon monoxide and some of the hydrogen to methane and water vapor. Remaining carbon monoxide is then additionally scrubbed from the hydrogen, methane and water vapor gas stream in the polisher 137, which may comprise a silver based adsorption device which adsorbs carbon monoxide. The polisher may comprise plural adsorption beds where one bed adsorbs carbon monoxide while other beds are being regenerated. The outlet stream containing hydrogen, methane and water vapor from the polisher is then provided to the hydrogen storage vessel 129 or the hydrogen using device 131 (the separate purge gas outlet from the polisher 137 is not shown for clarity). The hydrogen may be used as the fuel in the PEM fuel cell system 131, the water vapor may be used to humidify the PEM electrolyte and the methane simply acts as a diluting gas in a PEM system.

Alternatively, the carbon monoxide scrubbing device 133 may comprise a pressure swing adsorption ("PSA") unit. This unit is similar to the PPSA unit 401, except that a reciprocating compressor is used to pressurize the feed gas into one or more adsorbent beds which contain a material which selectively adsorbs carbon monoxide compared to hydrogen. The pressure swing adsorption unit may operate on a Skarstrom-like PSA cycle. The classic Skarstrom cycle consists of four basic steps: pressurization, feed, blowdown, and purge. For example, the PSA unit may contain two adsorbent beds. When one bed is undergoing pressurization and feed by the compressor, the other column is undergoing blowdown and purge. Three-way valves may be used to direct the feed, purge and product gases between the beds.

Alternatively, the optional device 131 may comprise a carbon monoxide tolerant electrochemical cell, such as a stack of high-temperature, low-hydration ion exchange membrane cells. This type of cell includes a non-fluorinated ion exchange ionomer membrane, such as, for example, a polybenzimidazole (PBI) membrane, located between anode and cathode electrodes. The membrane is doped with an acid, such as sulfuric or phosphoric acid. An example of such cell is disclosed in US published application US 2003/0196893 A1, incorporated herein by reference in its entirety. A stack 131 of these cells may be operated in a fuel cell mode to generate electricity for a vehicle or other uses when hydrogen is provided to the cells of the stack. These cells are carbon monoxide tolerant and operate in a temperature range of above 100 to about 200 degrees Celsius. Thus, the hydrogen containing stream is preferably provided to the stack 131 at a temperature above about 120 degrees Celsius. If a carbon monoxide tolerant device 131 is used, then the carbon monoxide scrubbing device 133 is preferably omitted.

The system 100 also contains a fuel splitter device 201, such as a computer or operator controlled multi-way valve, for example a three-way valve, or another fluid splitting device. The device 201 contains an inlet 203 operatively connected to the fuel cell stack fuel exhaust outlet 103, a first outlet 205 operatively connected to the condenser 113 and water separator 115 and a second outlet 207 operatively connected to the fuel cell stack fuel inlet 105. For example, the second outlet 207 may be operatively connected to the fuel inlet line 29, which is operatively connected to inlet 105. However, the second outlet 207 may provide a portion of the fuel exhaust stream into the fuel inlet stream further downstream.

Preferably, the system 100 contains a second blower or compressor 209 which provides the fuel exhaust stream into the fuel inlet stream. Specifically, the outlet 207 of the valve 201 is operatively connected to an inlet of the blower or compressor 209, while an outlet of the blower or compressor 209 is connected to the hydrocarbon fuel inlet line 29. In operation, the blower or compressor 209 controllably provides a desired amount of the fuel cell stack fuel exhaust stream into the fuel cell stack fuel inlet stream. In one aspect of this embodiment, the device 209 is a low temperature blower which operates at a temperature of 200 degrees Celsius or less. In this case, the heat exchangers 121 and 125 lower the temperature of the fuel exhaust stream to 200 degrees Celsius or less to allow the use of the low temperature blower 209.

The system 100 of the third embodiment operates as follows. A fuel inlet stream is provided into the fuel cell stack 101 through fuel inlet line 29. The fuel may comprise any suitable fuel, such as a hydrocarbon fuel, including but not limited to methane, natural gas which contains methane with hydrogen and other gases, propane or other biogas, or a mixture of a carbon fuel, such as carbon monoxide, oxygenated carbon containing gas, such as methanol, or other carbon containing gas with a hydrogen containing gas, such as water vapor, $H_2$ gas or their mixtures. For example, the mixture may comprise syngas derived from coal or natural gas reformation.

The fuel inlet stream is combined with a portion of the fuel exhaust stream such that hydrogen and humidity (i.e., water vapor) from the fuel exhaust stream is added to the fuel inlet stream. The humidified fuel inlet stream then passes through the fuel heat exchanger 121 where the humidified fuel inlet stream is heated by the fuel cell stack fuel exhaust stream. The heated and humidified fuel inlet stream is then provided into a reformer 37, which is preferably an external reformer. For example, reformer 37 may comprise a reformer described in U.S. patent application Ser. No. 11/002,681, filed on Dec. 2, 2004, incorporated herein by reference in its entirety. The fuel reformer 37 may be any suitable device which is capable of partially or wholly reforming a hydrocarbon fuel to form a carbon containing and free hydrogen containing fuel. For example, the fuel reformer 37 may be any suitable device which can reform a hydrocarbon gas into a gas mixture of free hydrogen and a carbon containing gas. For example, the fuel reformer 37 may comprise a catalyst coated passage where a humidified biogas, such as natural gas, is reformed via a steam-methane reformation reaction to form free hydrogen, carbon monoxide, carbon dioxide, water vapor and optionally a residual amount of unreformed biogas. The free hydrogen and carbon monoxide are then provided into the fuel (i.e., anode) inlet 105 of the fuel cell stack 101. Thus, with respect to the fuel inlet stream, which is located upstream of the reformer 37 which is located upstream of the stack 101.

The air or other oxygen containing gas (i.e., oxidizer) inlet stream is preferably provided into the stack 101 through a heat exchanger 127, where it is heated by the air (i.e., cathode) exhaust stream from the fuel cell stack. If desired, the air inlet stream may also pass through the condenser 113 and/or the air preheat heat exchanger 125 to further increase the temperature of the air before providing the air into the stack 101.

Once the fuel and air are provided into the fuel cell stack 101, the stack 101 is operated to generate electricity and a hydrogen containing fuel exhaust stream. The fuel exhaust stream (i.e., the stack anode exhaust stream) is provided from the stack fuel exhaust outlet 103 into the partial pressure swing adsorption unit 401. At least a portion of hydrogen contained in the fuel exhaust stream is separated in the unit 401 using a partial pressure swing adsorption. The hydrogen separated from the fuel exhaust stream in the unit 401 is then provided into the fuel inlet stream and/or to the hydrogen storage vessel 129 or the hydrogen using device 131.

The fuel exhaust stream is provided into the unit 401 as follows. The fuel exhaust stream may contain hydrogen, water vapor, carbon monoxide, carbon dioxide, some unreacted hydrocarbon gas, such as methane and other reaction by-products and impurities. For example, the fuel exhaust may have a flow rate of between 160 and 225 slpm, such as about 186 to about 196 slpm, and may comprise between about 45 to about 55%, such as about 48-50% hydrogen, about 40 to about 50%, such as about 45-47% carbon dioxide, about 2% to about 4%, such as about 3% water and about 1% to about 2% carbon monoxide.

This exhaust stream is first provided into the heat exchanger 121, where its temperature is lowered, preferably to less than 200 degrees Celsius, while the temperature of the fuel inlet stream is raised. If the air preheater heat exchanger 125 is present, then the fuel exhaust stream is provided through this heat exchanger 125 to further lower its temperature while raising the temperature of the air inlet stream. The temperature may be lowered to 90 to 110 degrees Celsius for example.

The fuel exhaust stream is then separated into at least two streams by the device 201. The first fuel exhaust stream is provided toward device 209 which recycles this first stream into the fuel inlet stream, while the second fuel exhaust stream is directed toward the PPSA unit 401 where at least a portion of hydrogen contained in the second fuel exhaust stream is separated using the partial pressure swing adsorption. At least a portion of the hydrogen separated from the second fuel exhaust stream is then provided to the hydrogen storage vessel 129 or the hydrogen using device 131, and/or a portion of the hydrogen and carbon monoxide separated from the second fuel exhaust stream are provided into the fuel inlet stream in the fuel inlet line 29. For example, between 50 and 70%, such as about 60% of the fuel exhaust stream may be provided to the second blower or compressor 209, while the remainder may be provided toward the PPSA unit 401.

Preferably, the fuel exhaust stream is first provided through the heat exchanger 121, reactor 128 and heat exchanger 125 before being provided into the valve 201. The fuel exhaust stream is cooled to 200 degrees Celsius or less, such as to 90 to 180 degrees, in the heat exchanger 125 prior to being provided into the valve 201 where it is separated into two streams. This allows the use of a low temperature blower 209 to controllably recycle a desired amount of the first fuel exhaust stream into the fuel inlet stream, since such blower may be adapted to move a gas stream which has a temperature of 200 degrees Celsius or less.

The first fuel exhaust stream is provided into the second blower or compressor 209 which recycles this stream into the fuel inlet stream. The device 209 may be computer or operator controlled and may vary the amount of the fuel exhaust stream being provided into the fuel inlet stream depending on any suitable parameters, which include: i) detected or observed conditions of the system 100 (i.e., changes in the system operating conditions requiring a change in the amount of hydrogen or CO in the fuel inlet stream); ii) previous calculations provided into the computer or conditions known to the operator which require a temporal adjustment of the hydrogen or CO in the fuel inlet stream; iii) desired future changes, presently occurring changes or recent past changes in the operating parameters of the stack 101, such as changes in the electricity demand by the users of electricity generated by the stack, changes in price for electricity or hydrocarbon fuel compared to the price of hydrogen, etc., and/or iv) changes in the demand for hydrogen by the hydrogen user, such as the hydrogen using device, changes in price of hydrogen or hydrocarbon fuel compared to the price of electricity.

Furthermore, the second blower or compressor may be operated in tandem with the first blower or compressor 109. Thus, the operator or computer may separately vary the amount of hydrogen being provided into vessel 129 or device 131, the amount of hydrogen and carbon monoxide being provided into the fuel inlet stream by the first blower or compressor 109, and the amount of fuel exhaust stream being provided into the fuel inlet stream by the second blower or compressor 209 based on any suitable criteria, such as the ones described above. Furthermore, the computer or operator may take into account both the amount of hydrogen and carbon monoxide being provided into the fuel inlet stream by the first blower or compressor 109 and the amount of fuel exhaust stream being provided into the fuel inlet stream by the second blower or compressor 209 and optimize the amount of both based on the criteria described above.

The second fuel exhaust stream is provided from the valve 201 into the condenser 113 where it is further cooled to condense additional water vapor from the fuel exhaust stream. The fuel exhaust stream may be cooled in the condenser by the fuel cell stack air inlet stream or by a different air inlet stream or by another cooling fluid stream. The water condensed from the fuel exhaust stream is collected in the liquid state in the water separator 115. Water may be discharged from the separator 115 via conduit 117 and then drained away or reused.

The remaining fuel exhaust stream gas is then provided from the separator 115 as the feed gas inlet stream into inlet 402 of the partial pressure swing adsorption unit 401 via conduit 403. Furthermore, the purge gas inlet stream, such as a dried air stream is provided into the unit 401 from blower or compressor 406 through conduit 405 into inlet 404. If desired, the air stream may be dried using additional adsorbent beds in a temperature swing adsorption cycle before being provided into adsorbent beds of the unit 401. In this case, the heated air used in the temperature swing adsorption cycle to dry the silica gel or alumina in the adsorbent beds may be removed from unit 401 via a vent conduit 139.

Thus, the second fuel exhaust stream comprises hydrogen, carbon monoxide, water vapor, carbon dioxide as well as possible impurities and unreacted hydrocarbon fuel. During the separation step in unit 401, at least a majority of the water vapor and carbon dioxide in the fuel exhaust stream are adsorbed in at least one adsorbent bed while allowing at least a majority of the hydrogen and carbon monoxide in the fuel exhaust stream to be passed through the at least one adsorbent bed. Specifically, unpressurized fuel exhaust stream is provided into the first adsorbent bed to adsorb at least a majority of the water vapor and carbon dioxide remaining in the fuel exhaust stream in the first adsorbent bed until the first adsorbent bed is saturated, while the second adsorbent bed is regenerated by providing air having a relative humidity of 50% or less at about 30 degrees Celsius through the second adsorbent bed to desorb adsorbed carbon dioxide and water vapor. After the first bed is saturated with carbon dioxide, the unpressurized fuel exhaust stream is provided into the second adsorbent bed to adsorb at least a majority of the remaining water vapor and carbon dioxide in the fuel exhaust stream in the second adsorbent bed until the second adsorbent bed is saturated while regenerating the first adsorbent bed by providing air having a relative humidity of 50% or less at about 30 degrees Celsius through the first adsorbent bed to desorb the adsorbed carbon dioxide and water vapor.

The hydrogen and carbon monoxide separated from the fuel exhaust stream (i.e., feed gas outlet stream) are then removed from unit 401 through outlet 408 and conduit 407 and provided into the optional selector valve 108. The valve 108 divides the hydrogen containing stream provided from the PPSA unit 401 into a first stream, which is provided into the hydrocarbon fuel inlet stream in the inletline 29, and a second stream which is provided to the hydrogen storage vessel 129 or the hydrogen using device 131.

The valve 108 may divide the hydrogen containing stream into contemporaneous first and second streams, such that the first and the second streams are provided from the valve 108 at the same time. The valve 108 may vary the ratio of how much of the hydrogen containing stream provided from the PPSA unit 401 is provided into a first stream and how much of the hydrogen containing stream is provided into the second stream over time. Alternatively, the valve 108 may alternate between providing at least 90-100% of the hydrogen containing stream into the hydrocarbon fuel inlet stream and providing 90 to 100% of the hydrogen containing stream to the hydrogen storage vessel 129, for example. If desired one of the steams may be omitted and the valve 108 may simply constantly direct the hydrogen containing stream into either the vessel 129/device 131 or into the fuel inlet line 29.

The valve 108 may be operated by a computer and/or by an operator to controllably provide a desired amount of hydrogen into the fuel inlet stream and/or to one of the hydrogen storage vessel and the hydrogen using device. The computer or operator may vary this amount based on any suitable parameter. The parameters include: i) detected or observed conditions of the system 100 (i.e., changes in the system operating conditions requiring a change in the amount of hydrogen or CO in the fuel inlet stream); ii) previous calculations provided into the computer or conditions known to the operator which require a temporal adjustment of the hydrogen or CO in the fuel inlet stream; iii) desired future changes, presently occurring changes or recent past changes in the operating parameters of the stack 101, such as changes in the electricity demand by the users of electricity generated by the stack, changes in price for electricity or hydrocarbon fuel compared to the price of hydrogen, etc., and/or iv) changes in the demand for hydrogen by the hydrogen user, such as the hydrogen using device, changes in price of hydrogen or hydrocarbon fuel compared to the price of electricity, etc.

The second hydrogen rich stream may be provided directly to vessel 129 or device 131 or it may first be provided through the carbon monoxide scrubbing device 133 to scrub carbon monoxide from the second stream before providing the stream to a carbon monoxide intolerant device. For example, the second hydrogen stream may be first provided to the hydrogen storage vessel 129 and then provided from the hydrogen storage vessel 129 to the hydrogen using device, such as a PEM fuel cell system 131 in a vehicle, on demand or according to a predefined schedule. Alternatively, the second hydrogen stream may be provided to the hydrogen using device, such as a PEM fuel cell system 131 without first being provided to the hydrogen storage vessel 129.

The first hydrogen rich stream provided from the selector valve is recycled into the fuel inlet stream in the fuel inlet line 29. Preferably, this first hydrogen rich stream containing hydrogen and carbon monoxide is first provided into a blower or compressor 109, which is then used to controllably provide a desired amount of hydrogen and carbon monoxide separated from the fuel exhaust stream into the fuel inlet stream. The blower or compressor 109 may be operated by a computer or by an operator to controllably provide a desired amount of hydrogen and carbon monoxide into the fuel inlet stream, and may vary this amount based on any suitable parameter. The parameters include: i) detected or observed conditions of the system 100 (i.e., changes in the system operating conditions requiring a change in the amount of hydrogen or CO in the fuel inlet stream); ii) previous calculations provided into the computer or conditions known to the operator which require a temporal adjustment of the hydrogen or CO in the fuel inlet stream; and/or iii) desired future changes, presently occurring changes or recent past changes in the operating parameters of the stack 101, such as changes in the electricity demand by the users of electricity generated by the stack, etc. Thus, the blower or compressor may controllably vary the amount of hydrogen and carbon monoxide provided into the fuel inlet stream based on the above described and/or other criteria. Since the hydrogen and carbon monoxide are cooled to 200 degrees Celsius or less, a low temperature blower may be used to controllably provide the hydrogen and carbon monoxide into the line 29. If desired, the selector valve 108 and the blower or compressor 109 may be omitted and the entire hydrogen rich stream may be provided from the PPSA unit 401 to the hydrogen storage vessel 129 or the hydrogen using device 131.

The purge gas outlet stream from the PPSA unit may contain a trace amount of hydrogen and/or hydrocarbon gases trapped in the void volumes of the adsorbent beds. In other words, some trapped hydrogen or hydrocarbon gas may not be removed into conduit 407 by the flush steps. Thus, it is preferred that conduit 409 provide the purge gas outlet stream from PPSA unit 401 to a burner 107. The stack 101 air exhaust stream is also provided through heat exchanger 127 into the burner 107. Any remaining hydrogen or hydrocarbon gas in the purge gas outlet stream is then burned in the burner to avoid polluting the environment. The heat from the burner 107 may be used to heat the reformer 37 or it may be provided to other parts of the system 100 or to a heat consuming devices outside the system 100, such as a building heating system.

Thus, with respect to the fuel exhaust stream, the heat exchanger 121 is located upstream of the heat exchanger 125, which is located upstream of the condenser 113 and water separator 115, which is located upstream of the PPSA unit 401, which is located upstream of blower or compressor 109 which is located upstream of the fuel inlet line 29.

If desired, the system 100 may be used together with a humidifier. Such a system could then be operated in different modes to optimize electricity generation or to optimize hydrogen production for the hydrogen storage vessel 129 or the hydrogen using device 131. The system may be switched between different modes depending on the demand for and/or price of electricity and hydrogen or other factors.

The humidifier may having a first inlet operatively connected to a hydrocarbon fuel source, such as the hydrocarbon fuel inlet line 29, a second inlet operatively connected to the valve 201, a first outlet operatively connected to the fuel cell stack fuel inlet 105, and a second outlet operatively connected to the condenser 113 and water separator 115. In operation, the fuel humidifier humidifies a hydrocarbon fuel inlet stream from line 29 containing the recycled hydrogen and carbon monoxide using water vapor contained in a fuel cell stack fuel exhaust stream. The fuel humidifier may comprise a polymeric membrane humidifier, such as a Nafion® membrane humidifier, an enthalpy wheel or a plurality of water adsorbent beds, as described for example in U.S. Pat. No. 6,106,964 and in U.S. application Ser. No. 10/368,425, both incorporated herein by reference in their entirety. For example, one suitable type of humidifier comprises a water vapor and enthalpy transfer Nafion® based, water permeable membrane available from Perma Pure LLC. The humidifier passively transfers water vapor and enthalpy from the fuel exhaust stream into the fuel inlet stream to provide a 2 to 2.5 steam to carbon ratio in the fuel inlet stream. The fuel inlet stream temperature may be raised to about 80 to about 90 degrees Celsius in the humidifier.

When the system is operated to optimize electricity generation (i.e., to optimize the AC electrical efficiency of the system), the selector valve 108 provides the entire hydrogen rich stream from the PPSA unit 401 back into the fuel inlet conduit. The valve 201 provides a portion of the fuel exhaust stream into the fuel inlet line 29 to humidify the fuel inlet stream. In this case, the valve 201 may route the fuel exhaust stream into the fuel inlet conduit to by-pass the humidifier. The per pass fuel utilization rate is maximized to the highest reasonable operating value, such as about 75% to about 80%, for example, to optimize the electricity production. In this case, no hydrogen is provided to the hydrogen storage vessel 129 or to the hydrogen using device 131.

When the system is operated to optimize hydrogen generation for the hydrogen storage vessel 129 or to the hydrogen using device 131, the selector valve 108 provides the entire hydrogen rich stream from the PPSA unit 401 to the hydrogen storage vessel 129 or to the hydrogen using device 131. No hydrogen rich stream is provided into the fuel inlet conduit. In this case, the valve 201 provides the entire fuel exhaust stream from the stack into the humidifier where the fuel inlet stream is humidified, rather than providing a portion of the fuel exhaust stream into the fuel inlet line 29. The per pass fuel utilization rate is minimized to the lowest reasonable operating value, such as about 55% to about 60%, for example, to optimize the hydrogen production. In this case, a maximum amount of hydrogen is provided to the hydrogen storage vessel 129 or to the hydrogen using device 131. Furthermore, more hydrocarbon fuel may be provided to the fuel cell stack when the system operates to optimize hydrogen production than when the system operates to optimize electrical efficiency. For example, 50-100% more hydrocarbon fuel is provided to the stack 101 when the system is operating to optimize hydrogen production than when the system is operating to optimize electrical efficiency.

The system may also be operated to balance electrical efficiency and hydrogen production. In this case, the selector valve 108 splits the hydrogen rich stream from the PPSA unit 401 between the fuel inlet line 29 and the hydrogen storage vessel 129/hydrogen using device 131. Both steams may be provided at the same time or the valve may alternate between providing the first and the second streams. The amount of hydrogen provided between the two streams can be varied depending on the conditions described above. In this case, the valve 201 may provide the fuel exhaust stream into the fuel inlet stream and/or into the humidifier 119, depending on the desired parameters.

Figure 7:
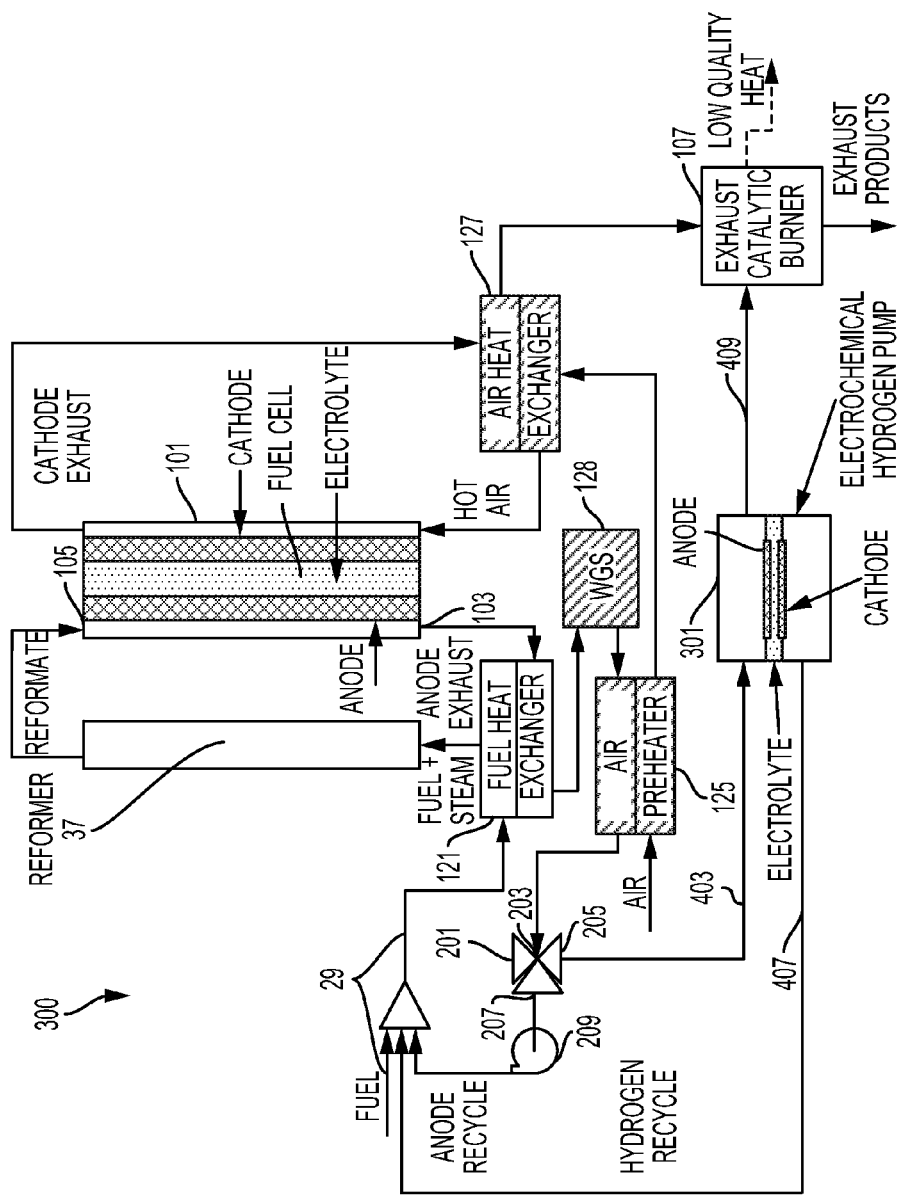

FIG. 7 illustrates a system 300 according to the fourth embodiment of the invention. The system 300 is similar to system 100, except that the PPSA unit 401, the condenser 113 and water separator 115 are replaced with an electrochemical hydrogen pump 301. The pump 301 electrochemically separates hydrogen from the fuel exhaust stream.

The electrochemical pump 301 may comprise any suitable proton exchange membrane device comprising a polymer electrolyte. The hydrogen diffuses through the polymer electrolyte under an application of a potential difference between anode and cathode electrodes located on either side of the electrolyte. Preferably, the electrochemical pump comprises a stack of carbon monoxide tolerant electrochemical cells, such as a stack of high-temperature, low-hydration ion exchange membrane cells. This type of cell includes a non-fluorinated ion exchange ionomer membrane, such as, for example, a polybenzimidazole (PBI) membrane, located between anode and cathode electrodes. The membrane is doped with an acid, such as sulfuric or phosphoric acid. An example of such cell is disclosed in US published application US 2003/0196893 A1, incorporated herein by reference in its entirety. These cells operate in a temperature range of above 100 to about 200 degrees Celsius. Thus, the heat exchangers 121 and 125 preferably keep the fuel exhaust stream at a temperature of about 120 to about 200 degrees Celsius such as about 160 to about 190 degrees Celsius. FIG. 7 does not illustrate for clarity the valve 108 and hydrogen storage vessel 129 or the hydrogen using device 131. However, these devices may be used in the system 300 if desired. Since the pump 301 provides a hydrogen stream that lacks a substantial amount of carbon monoxide, the CO scrubber 135 is not required to be used with the pump 301 and the hydrogen is provided into the fuel inlet stream without the carbon monoxide.

The method of operating the system 300 is similar to the method of operating the system 100, except that the fuel exhaust stream is provided directly from valve 201 into the electrochemical pump 301, which electrochemically separates the hydrogen from the fuel exhaust stream. Furthermore, the blower or compressor 109 may be omitted if the pump 301 is capable of controllably providing a desired amount of hydrogen into the fuel inlet stream. In the method of the fourth embodiment, the effective fuel utilization rate is about 94% and the electrical efficiency is about 58% when the per pass fuel utilization rate is 75%, 60% of the fuel exhaust stream is recycled into the fuel inlet stream by valve 201 and about 85% of the hydrogen is recovered from the remaining fuel exhaust stream by pump 301 and recycled into the fuel inlet stream.

In a fifth embodiment of the invention, a temperature swing adsorption ("TSA") unit is used to separate hydrogen from the fuel exhaust stream instead of the PPSA unit 401. A TSA unit also does not require the feed gas to be pressurized.

The TSA unit also contains a plurality of adsorbent beds of material which preferentially adsorbs carbon dioxide and water vapor to hydrogen and carbon monoxide. The fuel exhaust stream is provided to at least one first adsorbent bed which is maintained at room temperature or other low temperature to adsorb at large portion of carbon dioxide and water vapor from the fuel exhaust stream. When the first beds is saturated with carbon dioxide and water vapor, the fuel exhaust stream is switched to at least one second adsorbent bed. The first bed is then purged to release the adsorbed carbon dioxide and water vapor by increasing the temperature of the first bed. For example, the first bed may be heated by heat provided by the fuel cell stack, such as by providing the hot stack cathode air exhaust in heat exchange with the first bed. After purging, the first bed is then cooled with ambient air heat exchange. The cycle continues through the multiple beds to provide a constant recovery and circulation of the fuel. This embodiment is also amenable to the sequestration of carbon dioxide.

Rather than providing air in heat exchange with (i.e., adjacent to) the beds, the hot cathode exhaust may be directed through the adsorbent beds directly (with no separate heat exchanger) to discharge the carbon dioxide and water vapor. Then cool ambient air is passed directly through the beds to condition the beds for the next cycle. If desired, a small quantity of nitrogen may be is purged through the beds before and after the bed is reconditioned for additional carbon dioxide and water adsorption. The nitrogen is obtained from a small temperature swing adsorption device using air as the working fluid.

If desired, the TSA effluent, such as the carbon dioxide and water vapor containing effluent, may be discharged to ambient or removed via a vacuum pump after the purge gas is stopped. The vacuum removes more of the residual carbon dioxide and water (a process akin to pressure-swing adsorption, and commonly referred to as vacuum-swing adsorption) which might offer a less expensive and faster means to cool the bed than might be achieved using cool air or heat exchange. The use of the vacuum may also be amenable to the sequestration of carbon dioxide.

Figure 8:
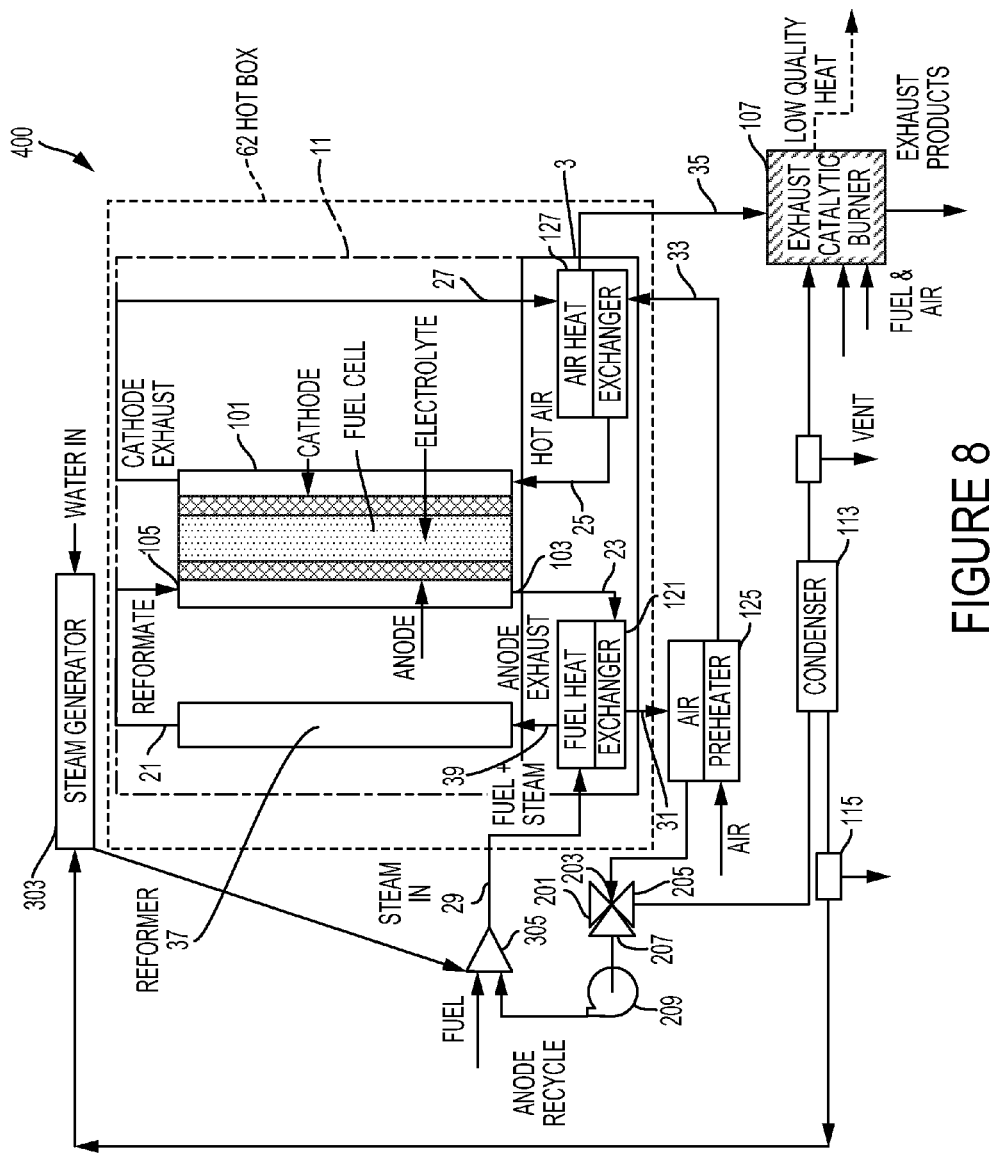

FIG. 8 illustrates a system 400 according to the sixth embodiment of the invention. The system 400 is similar to system 100, except that the PPSA unit 401 and the blower or compressor 109 are omitted. FIG. 8 also illustrates the location of the hot box 62 which may contain one or more fuel cell stack modules 1 or 61 of the first or second embodiments. Furthermore, FIG. 8 shows the location of the optional base 3 of the first embodiment.

If desired, a steam generator 303 may also be added to the system 400. The steam generator 303 is provided with water from a water source, such as a water tank and/or from the condenser 113 and water separator 115, and converts the water to steam. The steam is mixed with the inlet fuel stream in a mixer 305. The steam generator may be heated by a separate heater and/or by the hot cathode exhaust stream and/or by the low quality heat generated by the burner 107. Furthermore, the low quality heat generated by the burner 107 may be used to heat the reformer instead of or in addition to heating the steam generator 303. The exhaust products of the burner 107 may be provided into the air inlet stream directed into the fuel cell stack. The steam generator 303 and the air preheater 125 may be located in a separate hot box annex which is placed in contact with the hot box 62. For example, the hot box annex may comprise a separate container located on top of the hot box. It should be noted that the above described features may also be provided into the systems 100 and 300 of FIGS. 6 and 7.

The method of operating the system 400 is similar to the method of operating the system 100, except that the second fuel exhaust stream provided from valve 201 is not subjected to hydrogen separation. Instead, the second fuel exhaust stream provided from the valve 201 is either vented or provided to the burner 207. This system 400 is thus simpler than the systems of the prior embodiments, since it does not include hydrogen separation steps and equipment.

The method of operating the system 400 allows the use of a low temperature blower 209 by cooling the fuel exhaust stream to about 90 to 110 degrees Celsius in heat exchangers 121 and 125. In the method of the sixth embodiment, the electrical efficiency is about 54% when the per pass fuel utilization rate is 75% and 60% of the fuel exhaust stream is recycled into the fuel inlet stream by valve 201.

The fuel cell systems described herein may have other embodiments and configurations, as desired. Other components may be added if desired, as described, for example, in U.S. application Ser. No. 10/300,021, filed on Nov. 20, 2002, in U.S. Provisional Application Ser. No. 60/461,190, filed on Apr. 9, 2003, and in U.S. application Ser. No. 10/446,704, filed on May 29, 2003 all incorporated herein by reference in their entirety. Furthermore, it should be understood that any system element or method step described in any embodiment and/or illustrated in any figure herein may also be used in systems and/or methods of other suitable embodiments described above, even if such use is not expressly described.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

What is claimed is:

1. A modular fuel cell system, comprising:
   a first container comprising doors;
   fuel cell stack modules disposed in the first container, such that each fuel cell stack modules may be accessed through a corresponding one of the doors, each fuel cell stack module comprising:
      a base;
      a cover dome disposed on the base and comprising a thermally insulating material; and
      fuel cell stacks disposed on the base and inside of the cover dome;
      a fuel reformer disposed on the base and fluidly connected to the fuel cell stacks;
      a fuel heat exchanger configured to heat fuel provided to the fuel reformer using fuel exhaust from the fuel cell stacks; and
      an air heat exchanger configured to heat air provided to the fuel cell stacks using air exhaust emitted from the fuel cell stacks;
   at least one fuel processing module; and
   at least one power conditioning module,
   wherein:
   the modular fuel cell system is configured such that at least one module can be taken off line without taking the remaining modules off line;
   each type of module is installed in or on a separate container; and
   the containers are located separately from each other.

2. The system of claim 1, wherein each module is configured to be serviced, repaired or removed from the system without opening the containers in which the other type of modules are located and without servicing, repairing or removing the other type of modules.

3. The system of claim 2, wherein each module is configured to be accessed from two or more sides.

4. The system of claim 3, wherein a plurality of the fuel cell stack modules are configured to be indexed to be accessed from two or more sides.

5. The system of claim 2, wherein all high service or consumable components are located in a single module.

6. The system of claim 5, wherein a purge gas and desulfurizer material is located in a single module.

7. The system of claim 1, wherein:
   the system is configured such that one of several optional modules is selected for each of fuel processing, fuel cell, and power conditioning;
   the fuel processing modules may be interchanged without modification to the fuel cell modules or to the power conditioning modules; and
   the power conditioning modules may be interchanged without modification to the fuel cell modules or to the fuel processing modules.

8. The system of claim 1, further comprising a single user interface which is adapted to operate the at least one fuel cell stack module, the at least one fuel processing module, and the at least one power conditioning module.

* * * * *